US009079307B2

(12) United States Patent
Fernando et al.

(10) Patent No.: US 9,079,307 B2
(45) Date of Patent: Jul. 14, 2015

(54) AUTONOMOUS LOCOMOTION APPARATUS, AUTONOMOUS LOCOMOTION METHOD, AND PROGRAM FOR AUTONOMOUS LOCOMOTION APPARATUS

(71) Applicant: Panasonic Corporation, Osaka (JP)

(72) Inventors: Jeffry Bonar Fernando, Osaka (JP); Katsuyoshi Yamagami, Osaka (JP); Toru Tanigawa, Osaka (JP); Yumi Wakita, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 114 days.

(21) Appl. No.: 14/047,427

(22) Filed: Oct. 7, 2013

(65) Prior Publication Data

US 2014/0031981 A1 Jan. 30, 2014

Related U.S. Application Data

(63) Continuation of application No. PCT/JP2012/005744, filed on Sep. 11, 2012.

(30) Foreign Application Priority Data

Sep. 29, 2011 (JP) ................................. 2011-214898

(51) Int. Cl.
*G06F 19/00* (2011.01)
*G05D 1/02* (2006.01)
(Continued)

(52) U.S. Cl.
CPC .............. *B25J 9/1676* (2013.01); *G05D 1/024* (2013.01); *G05D 1/0274* (2013.01); *G05B 2219/40203* (2013.01); *G05D 2201/0206* (2013.01)

(58) Field of Classification Search
USPC ................. 700/253, 255, 250, 259, 258, 245; 901/1, 46; 340/988; 701/467, 519, 526, 701/527; 300/301
See application file for complete search history.

(56) References Cited

U.S. PATENT DOCUMENTS 4,361,202 A * 11/1982 Minovitch ..................... 180/168
5,390,118 A * 2/1995 Margolis et al. ................ 701/23
(Continued)

FOREIGN PATENT DOCUMENTS

JP 2001-154706 6/2001
JP 2004-118469 4/2004
(Continued)

OTHER PUBLICATIONS

International Preliminary Report on Patentability and Written Opinion of the International Searching Authority issued Apr. 10, 2014 in International (PCT) Application No. PCT/JP2012/005744.
(Continued)

*Primary Examiner* — Ronnie Mancho
(74) *Attorney, Agent, or Firm* — Wenderoth, Lind & Ponack, L.L.P.

(57) ABSTRACT

The autonomous locomotion apparatus has a human information acquisition unit which detects a person. When there is probability of contact between the detected person and the autonomous locomotion apparatus based on movement information of the person, the autonomous locomotion apparatus controls a traveling speed or a rotational speed of the autonomous locomotion apparatus to perform a guide operation which presents a path of the autonomous locomotion apparatus which is intended to cause the person to predict, so that it causes the person to avoid the path without giving the person a sense of uneasiness.

15 Claims, 28 Drawing Sheets

(51) Int. Cl.
*G05B 19/04* (2006.01)
*B25J 9/16* (2006.01)

(56) References Cited

U.S. PATENT DOCUMENTS

| | | |
|---|---|---|
| 8,346,931 B2 * | 1/2013 | Bobak et al. ............. 709/226 |
| 2008/0249660 A1 | 10/2008 | Nakamura |
| 2008/0249662 A1 | 10/2008 | Nakamura |
| 2009/0254235 A1 * | 10/2009 | Kuroda ..................... 701/23 |
| 2010/0222925 A1 * | 9/2010 | Anezaki .................... 700/253 |
| 2010/0235033 A1 * | 9/2010 | Yamamoto et al. ........ 701/26 |
| 2010/0304640 A1 * | 12/2010 | Sofman et al. ............ 446/456 |
| 2011/0117903 A1 * | 5/2011 | Bradley ..................... 455/418 |
| 2011/0288684 A1 * | 11/2011 | Farlow et al. ............. 700/264 |
| 2014/0249676 A1 * | 9/2014 | Florencio et al. ......... 700/259 |

FOREIGN PATENT DOCUMENTS

| | | |
|---|---|---|
| JP | 2008-254134 | 10/2008 |
| JP | 2008-257531 | 10/2008 |

OTHER PUBLICATIONS

International Search Report issued Nov. 20, 2012 in International (PCT) Application No. PCT/JP2012/005744.
Dirk Helbing et al., "Social Force Model for Pedestrian Dynamics", Physical Review E., vol. 51, No. 5, pp. 4282-4286, May 1995.

* cited by examiner

AUTONOMOUS LOCOMOTION APPARATUS, AUTONOMOUS LOCOMOTION METHOD, AND PROGRAM FOR AUTONOMOUS LOCOMOTION APPARATUS

CROSS-REFERENCE TO RELATED APPLICATIONS

This is a continuation application of International Application No. PCT/JP2012/005744, with an international filing date of Sep. 11, 2012, which claims priority of Japanese Patent Application No. 2011-214898 filed on Sep. 29, 2011, the content of which is incorporated herein by reference.

TECHNICAL FIELD

The technical field relates to an autonomous locomotion apparatus, locomotion of which is controlled by a control unit, an autonomous locomotion method, and a program the autonomous locomotion apparatus.

BACKGROUND ART

FA (factory automation) robots operate in the situation where the robots are spatially isolated from people (i.e., in an area where no person is present) for its efficient operation and safety ensuring. Some robots, such as a building-cleaning robot, take the form of operating in the situation where the robots are temporally isolated from people (i.e., during a period of time when no person is present in the area) for efficient operation and safety ensuring. The robots which operate in the area, in which people are living, to relieve people from their loads in daily life or assist people in their daily life, in other words, the robots which can coexist with people, will be considered more important in the future. The robots include, for example, robots working in a hospital such as a robot which autonomously travels to carry loads or a robot which travels while cleaning the floor during a period of time when people are present in the area.

That kinds of robots may collide with persons while the robots are traveling; therefore, it is required for the robots to travel while avoiding collisions with any obstacles including persons to ensure safety of people.

For example, JP 2001-154706 A (Patent Literature 1) proposes a system of avoiding a collision by giving a virtual repulsive potential to an obstacle in a moving space of a robot and having the robot receive a virtual repulsive force responded to the repulsive potential.

In addition, assuming that the robot coexists with people, it is desirable that the operation of the robot or the purpose of the operation of the robot is easily understood by people.

For example, JP 2004-118469 A (Patent Literature 2) proposes a system of causing a robot to present the direction of searching for an obstacle or the next direction of travel to a person through rotation of its head or movement of its eyes by having rotatably attached a display device which imitates eye movements to the head of the robot.

SUMMARY OF THE INVENTION

However, in the case where an avoidance action of the robot in accordance with the potential is not in time to avoid the collision, for example, in the case where a robot comes across a person in a particularly narrow space or a passage of an intersection, the system of Patent Literature 1 may highly possible to cause the robot and the person to stop and become stalled. In such a case, the robot is forced to stop for safety ensuring. Therefore, the system has a disadvantage in such an environment in which the robot frequently encounters persons because the system frequently stops the robot and, as a result, significantly decreases travel efficiency of the robot.

Further, since the system of Patent Literature 1 causes the robot to travel by avoiding the person in accordance with the potential, it is not easy for the person to understand the intention of the robot's behavior; therefore, the system has a disadvantage in that it causes the robot to make the person feel uneasy when the person passes by the robot which is performing the avoiding operation.

In addition, the system of Patent Literature 1 has a disadvantage in that it causes the robot to make the person feel uncertain about when and in which direction the robot is to start moving while the person is passing by the robot which is forced to stop.

The system of PATENT LITERATURE 2 has a disadvantage in that a person who sees movement of the robot for the first time does not necessarily understand that the movement of the graphic imitating eyeballs shown on the display device of the robot or the rotation of the display device on the robot's head is intended to indicate the robot's direction of travel. For example, merely by watching the robot rotating its head, the person is uncertain whether the robot is operating in a simple guard mode or is about to change its direction.

Further, the system also has a disadvantage in that the intention of the robot's movement is not even conveyed to a person as far as the person does not see the head of the robot.

One non-limiting and exemplary embodiment provides an autonomous locomotion apparatus, an autonomous locomotion method, and a program for the autonomous locomotion apparatus, each of which is capable of passing by a person without decreasing the operational efficiency and also without making the person feel uneasy when the person and the autonomous locomotion apparatus are passing each other.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: An autonomous locomotion apparatus which autonomously moves based on a moving path, comprising a control unit, the control unit comprising:
an environment information acquisition unit that acquires environment information including information about a person or an object in surroundings of the autonomous locomotion apparatus;
a human information acquisition unit that detects the person based on the environment information acquired by the environment information acquisition unit;
a contact probability judgment unit that judges presence or absence of probability of guiding an avoiding operation of the person on condition that there is probability of contact between the person and the autonomous locomotion apparatus based on the environment information at a moment when the person is detected by the human information acquisition unit;
a guide operation generation unit that generates guide operation information which presents a predicted moving path of the autonomous locomotion apparatus to the person on the condition that there is probability of guiding an avoiding operation of the person;

a traveling speed and rotational speed control unit that controls movement of the autonomous locomotion apparatus based on the guide operation information from the guide operation generation unit;

a reaction information acquisition unit that acquires reaction information of the person with respect to a guide operation performed by the traveling speed and rotational speed control unit controlling the movement of the autonomous locomotion apparatus based on the guide operation information; and a guide operation keeping unit that keeps the guide operation according to the reaction information acquired by the reaction information acquisition unit.

These general and specific aspects may be implemented using a system, a method, and a computer program, and any combination of systems, methods, and computer programs.

According to the autonomous locomotion apparatus, the autonomous locomotion method, and the program for the autonomous locomotion apparatus of the aspects of the present invention, when the autonomous locomotion apparatus and a person are passing each other, the autonomous locomotion apparatus can pass by the person without decreasing the operational efficiency and also without making the person feel uneasy.

BRIEF DESCRIPTION OF THE DRAWINGS

These and other aspects and features of the present disclosure will become clear from the following description taken in conjunction with the embodiments thereof with reference to the accompanying drawings, in which.

DETAILED DESCRIPTION

Figure 1A:
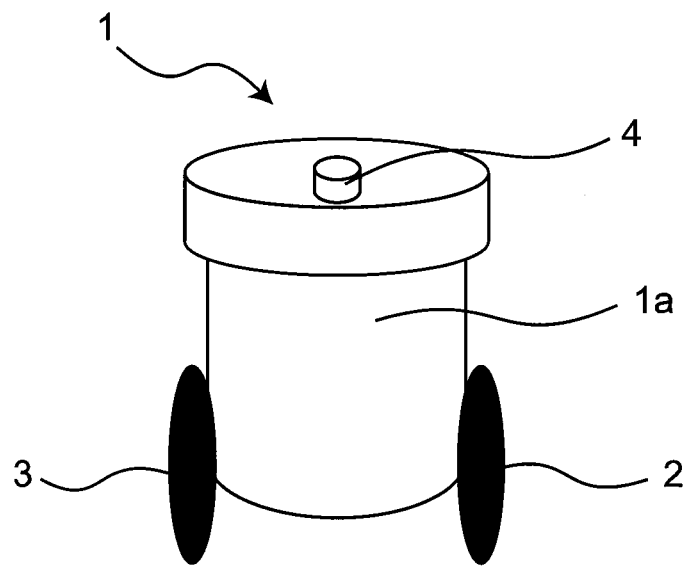
FIG. 1A is a front view of an autonomous locomotion apparatus according to a first embodiment of the present invention.

An embodiment of the present invention will be described in detail below with reference to the drawings.

Various aspects of the present invention will be described below before describing the embodiment of the present invention in detail with reference to the drawings.

Examples of the disclosed technique are as follows.

1st aspect: An autonomous locomotion apparatus which autonomously moves based on a moving path, comprising a control unit, the control unit comprising:
an environment information acquisition unit that acquires environment information including information about a person or an object in surroundings of the autonomous locomotion apparatus;

a human information acquisition unit that detects the person based on the environment information acquired by the environment information acquisition unit;

a contact probability judgment unit that judges presence or absence of probability of guiding an avoiding operation of the person on condition that there is probability of contact between the person and the autonomous locomotion apparatus based on the environment information at a moment when the person is detected by the human information acquisition unit;

a guide operation generation unit that generates guide operation information which presents a predicted moving path of the autonomous locomotion apparatus to the person on the condition that there is probability of guiding an avoiding operation of the person;

a traveling speed and rotational speed control unit that controls movement of the autonomous locomotion apparatus based on the guide operation information from the guide operation generation unit;

a reaction information acquisition unit that acquires reaction information of the person with respect to a guide operation performed by the traveling speed and rotational speed control unit controlling the movement of the autonomous locomotion apparatus based on the guide operation information; and a guide operation keeping unit that keeps the guide operation according to the reaction information acquired by the reaction information acquisition unit.

2nd aspect: The autonomous locomotion apparatus according to the 1st aspect, further comprising: an avoiding operation generation unit that generates an avoiding operation to be performed by the autonomous locomotion apparatus on condition that an obstacle other than the person is included in the environment information acquired by the environment information acquisition unit, or on condition that it is impossible to induce the person to make a movement of avoiding the moving path of the autonomous locomotion apparatus.

3rd aspect: The autonomous locomotion apparatus according to the 1st or 2nd aspect, wherein the environment information acquisition unit acquires the environment information observed by an environment observation unit which includes at least one of an LRF sensor, a millimeter-wave sensor, an ultrasonic sensor, and a stereo-camera.

4th aspect: The autonomous locomotion apparatus according to any one of the 1st to 3rd aspects, wherein the human information acquisition unit acquires a position, a speed, and a direction of travel of the person as movement information.

5th aspect: The autonomous locomotion apparatus according to any one of the 1st to 4th aspects, wherein the guide operation generation unit generates the predicted moving path of the autonomous locomotion apparatus with respect to the person by selecting a candidate from guide path candidates of high priorities based on a magnitude and a direction of a repulsive force applied to the person due to potential of the autonomous locomotion apparatus.

6th aspect: The autonomous locomotion apparatus according to the 4th aspect, wherein the guide operation generation unit generates the guide operation according to the movement information of the person, and the guide operation indicates that the moving path of the autonomous locomotion apparatus which is intended to cause the person to predict, is a path for the autonomous locomotion apparatus to temporarily travel in a direction opposite to that of a goal of the autonomous locomotion apparatus.

7th aspect: The autonomous locomotion apparatus according to the 4th aspect, wherein the guide operation generation unit generates the guide operation which is intended to cause the person to indicate a destination by the movement when the destination of the person is unknown even with the movement information of the person acquired by the human information acquisition unit.

8th aspect: The autonomous locomotion apparatus according to any one of the 1st to 7th aspects, wherein the guide operation generation unit generates, as the guide operation, an operation of the autonomous locomotion apparatus to block the moving path of the autonomous locomotion apparatus which is intended to cause the person to predict.

9th aspect: The autonomous locomotion apparatus according to any one of the 1st to 8th aspects, wherein the guide operation generation unit generates, as the guide operation, an operation for the autonomous locomotion apparatus to approach one of walls of both sides of the moving path while the autonomous locomotion apparatus is traveling to present the moving path of the autonomous locomotion apparatus which is intended to cause the person to predict.

10th aspect: The autonomous locomotion apparatus according to the 1st aspect, wherein the traveling speed and rotational speed control unit makes a traveling speed or a rotational speed of the autonomous locomotion apparatus slower during a predetermined period of time immediately after starting of the guide operation than in other periods, and the traveling speed and rotational speed control unit acquires the reaction information of the person by the reaction information acquisition unit in the predetermined period of time immediately after starting of the guide operation.

11th aspect: The autonomous locomotion apparatus according to any one of the 1st to 10th aspects, wherein the traveling speed and rotational speed control unit controls the traveling speed and the rotational speed to cause the autonomous locomotion apparatus to approach one of the walls of both sides of the path, when it is intended to cause the person to predict that the autonomous locomotion apparatus is to turn at a T-shaped passage or intersection.

12th aspect: The autonomous locomotion apparatus according to the 7th aspect, wherein, after it is judged that the destination of the person is indicated by the movement based on the movement information of the person acquired by the human information acquisition unit, the guide operation keeping unit keeps performing the operation of the autonomous locomotion apparatus in a space in a passage other than that toward the indicated destination.

13th aspect: The autonomous locomotion apparatus according to the 2nd aspect, wherein the avoiding operation generation unit generates the avoiding operation on condition that the reaction of the person may cause a collision between the person and the autonomous locomotion apparatus even though the guide operation is performed.

14th aspect: An autonomous locomotion method for an autonomous locomotion apparatus to autonomously move based on a moving path, comprising:

acquiring environment information including information about a person or an object in surroundings of the autonomous locomotion apparatus by an environment information acquisition unit;

detecting the person by a human information acquisition unit based on the environment information acquired by the environment information acquisition unit;

judging presence or absence of probability of guiding an avoiding operation of the person by a contact probability judgment unit on condition that there is probability of contact between the person and the autonomous locomotion apparatus based on the environment information at a moment when the person is detected by the human information acquisition unit;

generating guide operation information which presents a predicted moving path of the autonomous locomotion apparatus to the person by a guide operation generation unit on condition that there is probability of guiding an avoiding operation of the person;

controlling movement of the autonomous locomotion apparatus by a traveling speed and rotational speed control unit based on the guide operation information from the guide operation generation unit;

acquiring, by a reaction information acquisition unit, reaction information of the person with respect to a guide operation performed by the traveling speed and rotational speed control unit controlling the movement of the autonomous locomotion apparatus based on the guide operation information; and keeping, by a guide operation keeping unit, the guide operation according to the reaction information acquired by the reaction information acquisition unit.

15th aspect: A computer-readable recording medium including a program for an autonomous locomotion apparatus which autonomously moves based on a moving path, wherein the program causes a computer to function as:

an environment information acquisition unit that acquires environment information including information about a person or an object in surroundings of the autonomous locomotion apparatus;

a human information acquisition unit that detects the person based on the environment information acquired by the environment information acquisition unit;

a contact probability judgment unit that judges presence or absence of probability of guiding an avoiding operation of the person on condition that there is probability of contact between the person and the autonomous locomotion apparatus based on the environment information at a moment when the person is detected by the human information acquisition unit;

a guide operation generation unit that generates guide operation information which presents a predicted moving path of the autonomous locomotion apparatus to the person on the condition that there is probability of guiding an avoiding operation of the person;

a traveling speed and rotational speed control unit that controls movement of the autonomous locomotion apparatus based on the guide operation information from the guide operation generation unit;

a reaction information acquisition unit that acquires reaction information of the person with respect to a guide operation performed by the traveling speed and rotational speed control unit controlling the movement of the autonomous locomotion apparatus based on the guide operation information; and a guide operation keeping unit that keeps the guide operation according to the reaction information acquired by the reaction information acquisition unit.

An embodiment of the present invention will be described below with reference to the drawings.

(First Embodiment)

Figure 1B:
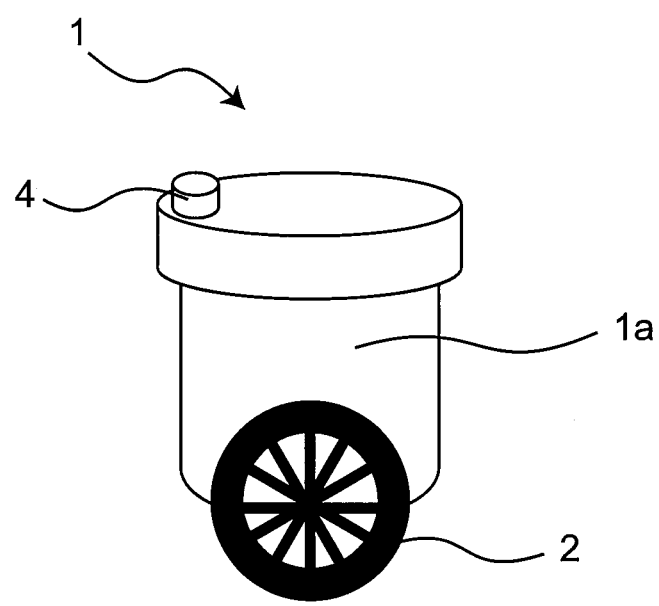
FIG. 1B is a side view of the autonomous locomotion apparatus according to the first embodiment of the present invention.

FIGS. 1A and 1B illustrate appearance of an autonomous locomotion apparatus 1 according to the first embodiment of the present invention. The autonomous locomotion apparatus 1 includes an autonomous locomotion apparatus main body 1a with a left wheel 2 and a right wheel 3 arranged at a lower part of the main body 1a to independently rotate forward and backward, an LRF (Laser Range Finder) sensor 4 fixed to an upper front part of the main body 1a, and a control unit 90 arranged inside the main body 1a.

The left wheel 2 and the right wheel 3 are respectively coupled to a left motor 2M and a right motor 3M, which are examples of driving device, to be independently driven to rotate forward and backward, and cause the autonomous locomotion apparatus 1 to travel back and forth. The autonomous locomotion apparatus 1 can turn to left and right against the back and forth directions by changing the rotational speeds of the left wheel 2 and the right wheel 3. Details of the LRF sensor 4 will be described later.

Figure 2A:
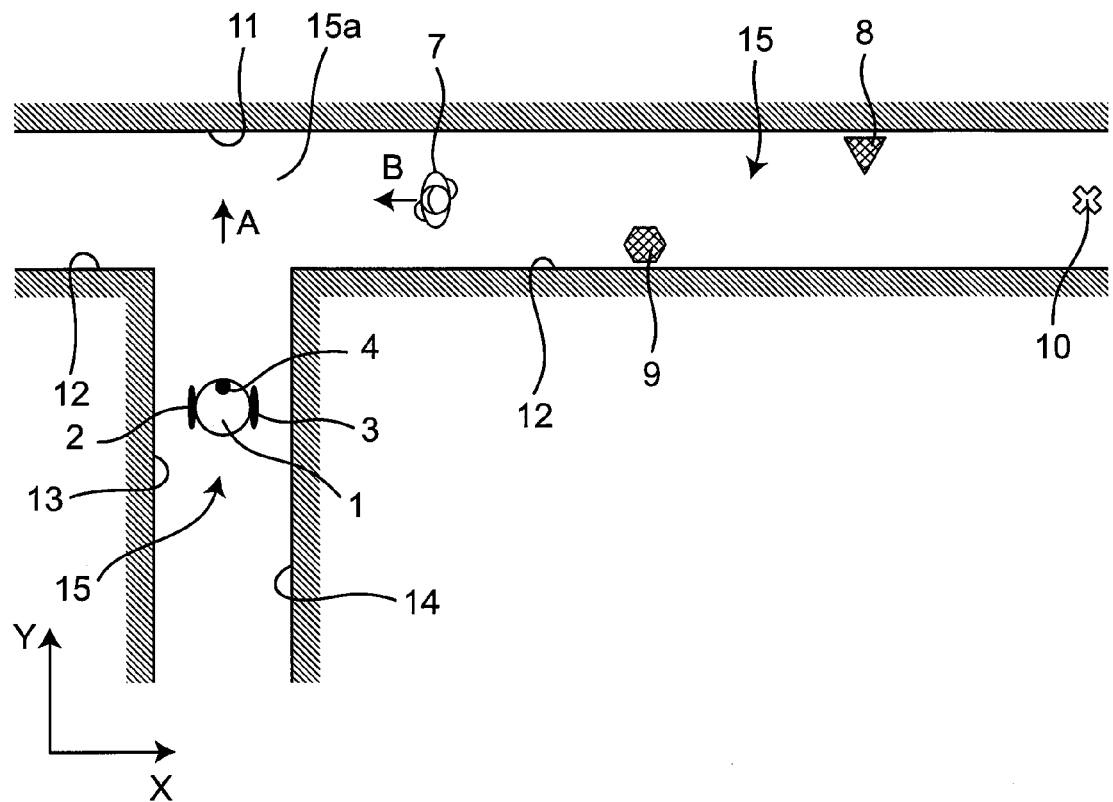
FIG. 2A is an explanatory view showing a scene of a person and the autonomous locomotion apparatus which are highly possible to collide with each other in the first embodiment.

FIG. 2A shows an example of a scene in which a person 7 and the autonomous locomotion apparatus 1 are to pass each other. FIG. 2A particularly shows a sudden encounter scene of the person 7 and the autonomous locomotion apparatus 1 which are highly possible to collide with each other or be stalled. That is, it is assumed that the autonomous locomotion apparatus 1 is approaching an intersection 15a of a T-shaped passage (T-shaped junction or T-junction) 15 and that the person 7 and the autonomous locomotion apparatus 1 are going to pass each other at the intersection 15a. In such a case, it is assumed that the width of the body of the person 7 is about 60 cm and the width of the autonomous locomotion apparatus 1 is 60 cm, for example. In this example, the width of the passage 15 is assumed to be 150 cm, which is wider than the sum of the widths of the person 7 and the autonomous locomotion apparatus 1 (60 cm+60 cm=120 cm) as a space allowing the person 7 and the autonomous locomotion apparatus 1 to pass each other.

Meanwhile, the first embodiment can also be applied to cases where the person 7 and the autonomous locomotion apparatus 1 are present in a scene other than the scene of a sudden encounter or the scene of a narrow space.

In FIG. 2A, the autonomous locomotion apparatus 1 is traveling in the direction of an arrow A toward a goal 10 in the passage 15. The person 7 is walking in the direction of an arrow B in the passage 15. The person 7 is likely to go straight on or turn left at the intersection 15a of the T-junction. The person 7 and the autonomous locomotion apparatus 1 are going to encounter and pass each other at the intersection 15a of the T-junction.

Here, it is assumed that the average walking speed of the person 7 is 4 kilometers per hour (1.11 m/s) and the traveling speed of the autonomous locomotion apparatus 1 without any obstacle around is 2 kilometers per hour (0.55 m/s), for example. The traveling speed of the autonomous locomotion apparatus 1 with an obstacle (s) around is slower than 2 kilometers per hour.

Figure 3:
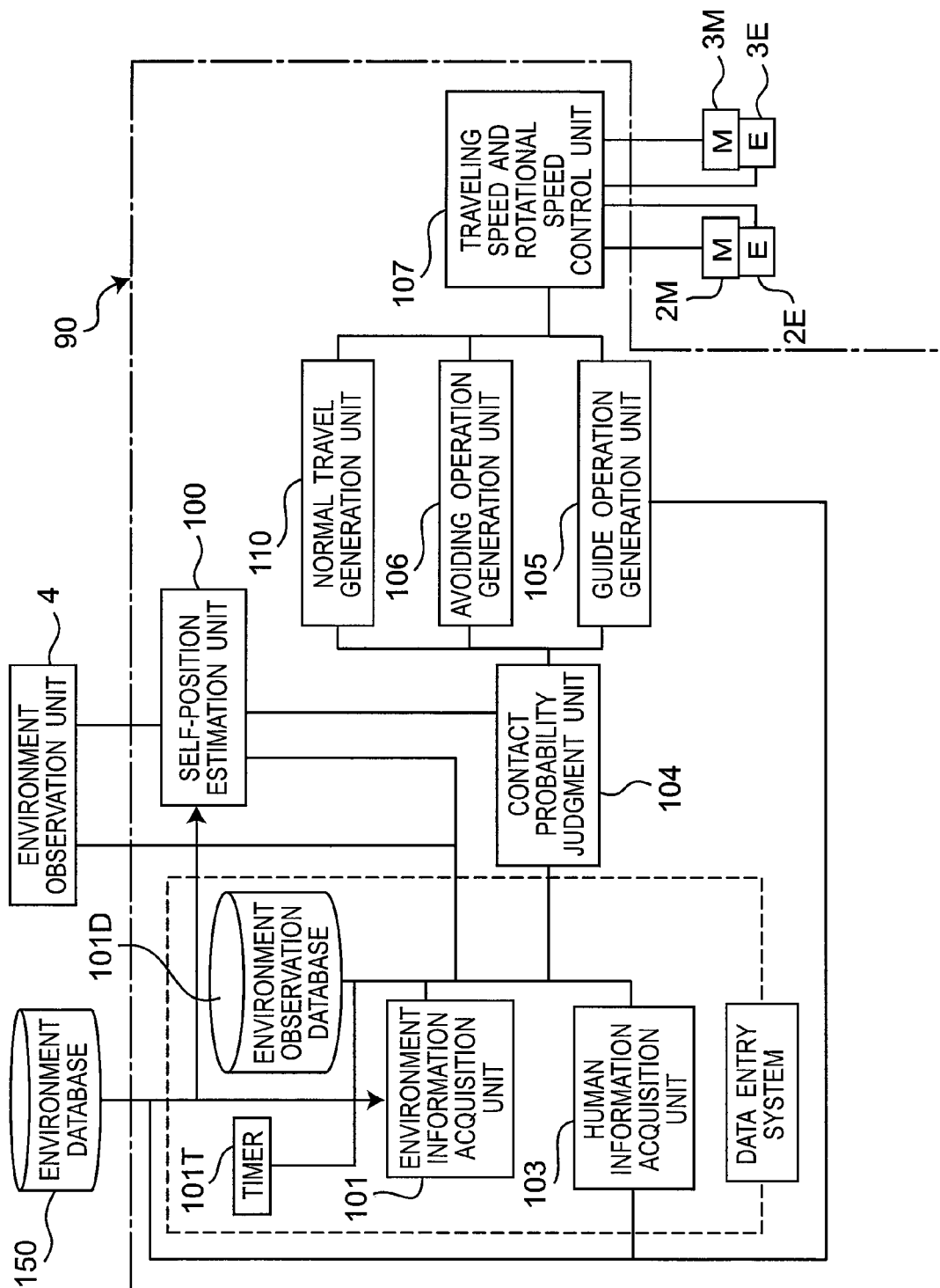
FIG. 3 is a block diagram illustrating a configuration of the autonomous locomotion apparatus according to the first embodiment.

FIG. 3 is a block diagram illustrating the autonomous locomotion apparatus 1 according to the first embodiment.

The autonomous locomotion apparatus 1 includes, as a control unit 90, an environment information acquisition means (an environment information acquisition unit) 101, an environment information database (environment information storage unit) 101D, a timer 101T, a human information acquisition means (a human information acquisition unit) 103, a contact probability judgment means (a contact probability judgment unit) 104, a guide operation generation means (a guide operation generation unit) 105, an avoiding operation generation means (an avoiding operation generation unit) 106, a normal travel generation means (a normal travel generation unit) 110, a traveling speed and rotational speed control means (a traveling speed and rotational speed control unit) 107, and a self-position estimation unit 100. The autonomous locomotion apparatus 1 includes an environment database (an environment storage unit) 150 other than the above described constituent elements, but it may be configured to retrieve information stored in the environment database 150 from a database outside of the autonomous locomotion apparatus 1 via an input/output interface and a communication line.

Figure 2B:
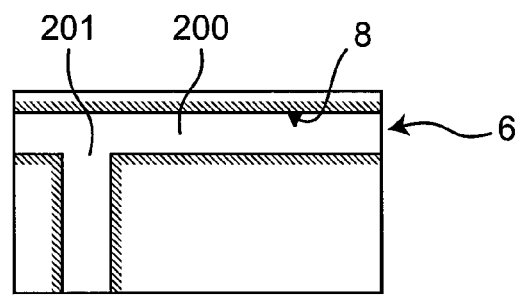
FIG. 2B is an explanatory view showing an environment map of the autonomous locomotion apparatus in the first embodiment.

The autonomous locomotion apparatus 1 has an environment map 6 illustrated in FIG. 2B which is stored in the environment database 150 and travels while confirming the obstacle (s) on the environment map 6 stored in the environment database 150. The environment map database 150 has previously stored the environment map 6 of a place in which the autonomous locomotion apparatus 1 travels and coexists with the person 7, and supplies data of the environment map 6 to the environment information acquisition means 101. Obstacles in the environment map 6 may be classified into two categories: the moving obstacles (for example, the person 7) and the static obstacles (for example, walls 11, 12, 13, and 14, or static obstacles 8 other than the walls). The static obstacles other than the walls include the static obstacle 8 included in the environment map 6 and a static obstacle 9 which is not included in the environment map 6. The environment map 6 is in a coordinate system. The coordinates of the walls 11, 12, 13, and 14 which define the passage 15, and the coordinates of the static obstacle 8 in the passage 15 which is included in the environment map 6 are included in the environment map 6, respectively.

The means such as the environment information acquisition means 101 and the human information acquisition means 103 comprise a data entry system.

Figure 4:
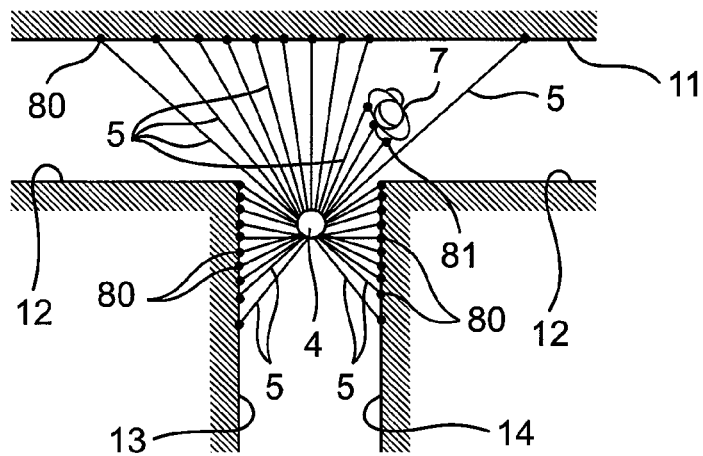
FIG. 4 is an explanatory view showing a case where an LRF (Laser Range Finder) sensor has measured a traveling environment and obstacles in the first embodiment.

The environment information acquisition means 101 observes environment information of the surroundings of the autonomous locomotion apparatus 1 by using an environment observation means every predetermined period of time based on information from the timer 101T, and records the information in the environment information database 101D (see step S201 of FIG. 30 to be described later). In the first embodiment, the environment information acquisition means 101 acquires the environment information observed by one LRF (Laser Range Finder) sensor 4, which is an example of the environment observation means (the environment observation unit). The environment information includes information about the person 7 or an object in the surroundings of the autonomous locomotion apparatus 1. Here, only one sensor is enough for the environment observation means of the environment information acquisition means 101, but sensor fusion using two or more sensors may be adopted to improve the measurement accuracy. The environment observation means (the environment observation unit) is not limited to the LRF sensor 4 and may be a sensor such as a millimeter-wave sensor, an ultrasonic sensor, or a stereo-camera. As illustrated in FIG. 4, while the autonomous locomotion apparatus 1 is traveling, the LRF sensor 4 irradiates a plurality of laser beams 5 toward the surroundings of the autonomous locomotion apparatus 1 every predetermined time interval to measure a distance from each obstacle in the surroundings. In the first embodiment, it is assumed that the LRF sensor 4 has the measurable range of 270 degrees as an example and irradiates the laser beams 5 at 0.25 degree intervals as an example. In FIG. 4, reference numerals 80 represent spots where the laser beams 5 hit known obstacles (in this example, the walls 11, 13, and 14) and reference numerals 81 represent spots where the laser beams 5 hit an unknown obstacle (in this example, the person 7). The distances from an irradiation hole for the laser beam 5 to these spots are measured by the LRF sensor 4 as the distances to the obstacle (s) in the surroundings. The measured result is the environment information.

The self-position estimation unit 100 performs self-position estimation on the autonomous locomotion apparatus 1 by using the environment information from the LRF sensor 4 and the environment map 6. Specifically, although not illustrated in the figures, the self-position estimation unit 100 may be adapted to receive information from encoders 2E and 3E for the left motor 2M and the right motor 3M for the left wheel 2 and the right wheel 3 so that the self-position estimation unit 100 can perform the self-position estimation on the autonomous locomotion apparatus 1 by also taking account of the information from the encoders 2E and 3E.

A method of performing the self-position estimation on the autonomous locomotion apparatus 1 by using the environment information from the LRF sensor 4 and the environment map 6 will be described below.

Figure 5:
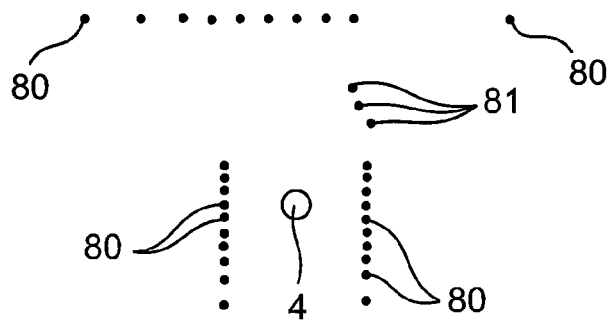
FIG. 5 is an explanatory view showing data acquired by the LRF sensor in the first embodiment.

The LRF sensor 4 emits the laser beams 5 at respective angles and uses the laser beams 5 in measuring the distances to obstacles placed at the angles. FIG. 5 illustrates data acquired by the LRF sensor 4. In FIG. 5, reference numerals 80 represent spots where the laser beams 5 hit known obstacles and reference numerals 81 represent spots where the laser beams 5 hit an unknown obstacle. From the data acquired by the LRF sensor 4, the shape of a distribution map of the obstacles (a map displaying the current position of the autonomous locomotion apparatus 1 (the position of the autonomous locomotion apparatus 1 at the moment of the processing) and the distribution of the obstacles) in the environment information of the surroundings of the current position of the autonomous locomotion apparatus 1 can be acquired by the environment information acquisition means 101. The shape of the distribution map of the obstacles in the environment information acquired by the environment information acquisition means 101 is acquired by the self-position estimation unit 100 to be compared with the environment map 6. The self-position estimation unit 100 repeats translation and rotation in comparing the acquired shape of the distribution map of the obstacles in the environment information with the environment map 6 to find the best match place between them. The current position of the autonomous locomotion apparatus 1 of the best match place found by the self-position estimation unit 100 is determined to be the self-position of the autonomous locomotion apparatus 1.

The human information acquisition means 103 detects an obstacle(s) which is not included in the environment map 6 in the environment database 150 from the environment information acquired by the environment information acquisition means 101. Then, the human information acquisition means 103 extracts the person 7 from the detected obstacles. That is, the human information acquisition means 103 acquires information about the person 7. The human information acquisition means 103 can acquire the position, the speed, and the direction of travel of the person 7 as the movement information of the person 7. Based on the self-position of the autonomous locomotion apparatus 1 and the distance from the person 7 measured by the LRF sensor 4, the position of the person 7 is estimated by the human information acquisition means 103. The time derivative of the position of the person 7 is estimated as the speed of the person 7 in the human information acquisition means 103. The vector of speed of the person 7 is estimated by the human information acquisition means 103 as the direction of travel of the person 7.

Now, a method of detecting the person 7 by the human information acquisition means 103 using the LRF sensor 4 will be described.

Even after the self-position estimation unit 100 estimates the self-position of the autonomous locomotion apparatus 1, the self-position estimation unit 100 detects the presence of distance data which partially does not match the environment map 6 from the plurality of laser beams 5 emitted from the LRF sensor 4. For example, as illustrated in FIG. 5, spots of some laser beams 5 which hit the person 7, which is an obstacle, appear as a group of points 81 representing an unknown obstacle which is not in the environment map 6. The self-position estimation unit 100 judges whether the group of points 81 representing the unknown obstacle is always at the same position while the autonomous locomotion apparatus 1 is traveling (i.e., even though the current position of the autonomous locomotion apparatus 1 changes with time). When the group of points 81 representing an unknown obstacle is always at the same position, the human information acquisition means 103 judges that the unknown obstacle is a static obstacle; if not, the human information acquisition means 103 judges that the unknown obstacle is a moving obstacle. The human information acquisition means 103 takes into account of the width of the moving obstacle to judge whether the moving obstacle is the person 7 or not. Based on the distance data from the LRF sensor 4, the human information acquisition means 103 estimates the width of the moving obstacle. For example, on the assumption that the width of the person 7 viewed from the front is about 60 cm and the width of the person 7 viewed from the side is about 30 cm, the human information acquisition means 103 can estimate that the detected moving obstacle with the width from 30 to 60 cm is the person 7. The information that the person 7 has the width from 30 to 60 cm may be stored, for example, in the environment database 150 to be retrieved by the human information acquisition means 103 from the environment database 150.

Based on the information from the self-position estimation unit 100 and the human information acquisition means 103, the autonomous locomotion apparatus 1 performs an avoiding operation by the avoiding operation generation means 106 (to be described later) on an obstacle other than the person 7. On the other hand, when the human information acquisition means 103 detects that the moving object is the person 7 based on the information from the self-position estimation unit 100, the autonomous locomotion apparatus 1 proceeds to the processing including the detection of a person or an obstacle by the human information acquisition means 103.

When a camera is used as an example of the human information acquisition means 103, the condition of the person 7 such as the collapsed state of the person 7 can also be acquired. When the human information acquisition means 103 judges that the person 7 cannot move like the collapsed person 7, the autonomous locomotion apparatus 1 proceeds to a process of the avoiding operation generation means 106 (to be described later). When it is judged otherwise by the human information acquisition means 103, the autonomous locomotion apparatus 1 proceeds to a process of the contact probability judgment means 104. The human information acquisition means 103 may judge that the person 7 cannot move like the collapsed person 7, on the condition that, for example, it has judged that the person 7 of the width 30 to 60 cm was moving, then, the width of the person 7 increased and the movement of the person 7 has stopped for a predetermined period of time or more.

First, the contact probability judgment means 104 judges contact probability of the autonomous locomotion apparatus 1 with such an obstacle as the person 7 based on the information acquired by the human information acquisition means 103. When the contact probability judgment means 104 judges that there is no contact probability, the autonomous locomotion apparatus 1 proceeds to a process of normal travel generation for keeping the autonomous locomotion apparatus 1 traveling it is by the normal travel generation means 110 (to be describe later). When the contact probability judgment means 104 judges that there is contact probability, probability of guide operation is judged by the contact probability judgment means 104.

Figure 6A:
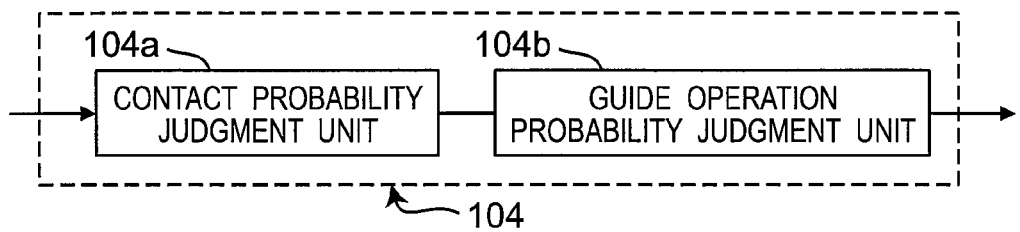
FIG. 6A is a detailed block diagram of a contact probability judgment means of the autonomous locomotion apparatus according to the first embodiment.
Figure 6B:
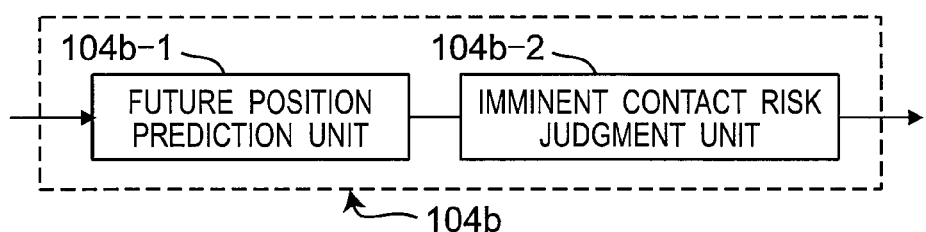
FIG. 6B is a detailed block diagram of a guide operation probability judgment means of the contact probability judgment means of the autonomous locomotion apparatus according to the first embodiment.

Specifically, as illustrated in FIG. 6A, the contact probability judgment means 104 has a contact probability judgment means (a contact probability judgment unit) 104a and a guide operation probability judgment means (a guide operation probability judgment unit) 104b. Further, as illustrated in FIG. 6B, the guide operation probability judgment means 104b has a future position prediction means (a future position prediction unit) 104b-1 and an imminent contact risk judgment means (an imminent contact risk judgment unit) 104b-2.

Therefore, the contact probability judgment means 104a judges the presence or absence of contact probability of the autonomous locomotion apparatus 1 and the person 7, i.e., whether the autonomous locomotion apparatus 1 and the person 7 will collide with each other if the autonomous locomotion apparatus 1 and the person 7 keep moving at their speeds in their directions. When the contact probability judgment means 104a judges that there is no contact probability, the autonomous locomotion apparatus 1 proceeds to the process of normal travel generation for keeping the autonomous locomotion apparatus 1 traveling as it is by the normal travel generation means 110 (to be describe later). When the contact probability judgment means 104a judges that there is contact probability, the autonomous locomotion apparatus 1 judges probability of guide operation by the guide operation probability judgment means 104b.

Based on the information from the contact probability judgment means 104a, the future position prediction means 104b-1 acquires the position information of the person 7 from the human information acquisition means 103 and also acquires the position information of the autonomous locomotion apparatus 1 from the environment information acquisition means 101 and the self-position estimation unit 100 at the moment when the person 7 is detected by the human information acquisition means 103. Then, the future position prediction means 104b-1 predicts the future position of the person 7 and the future position of the autonomous locomotion apparatus 1, respectively, of the predetermined period of time after the moment when the person 7 is detected by the human information acquisition means 103.

The imminent contact risk judgment means 104b-2 judges the presence or absence of contact probability of the person 7 and the autonomous locomotion apparatus 1 based on the information from the future position prediction means 104b-1.

Now, a method of predicting position information of the person 7 and the autonomous locomotion apparatus 1 after the predetermined period of time by the future position prediction means 104b-1 will be described with reference to FIG. 7.

In the present example, a case where the person 7 and the autonomous locomotion apparatus 1 pass each other at the intersection 15a of the T-junction 15 will be described.

The detectable range of the LRF sensor 4 is limited near the intersection 15a of the T-junction 15, since the radio wave from the LRF sensor 4 is blocked by the walls 11, 12, 13, and 14. The extended line including a line connecting the center position of the LRF sensor 4 and the corner 12a of the wall 12 is assumed to be a sensing boundary 20. The autonomous locomotion apparatus 1 detects the person 7 for the first time when the person 7 enters the detectable range within the sensing boundary 20, and the time point will be referred to as "human detection time $T_1$". The position and the speed of the autonomous locomotion apparatus 1 at the time point are $r_r(T_1)$ and $v_r(T_1)$, respectively. The position and the speed of the person 7 at the time point are $r_h(T_1)$ and $v_h(T_1)$, respectively.

The predicted position $r_r(T_2)$ of the autonomous locomotion apparatus 1 and the predicted position $r_h(T_2)$ of the person 7 for the time $T_2$, which is a predetermined period of time $\Delta T_s$ after the human detection time $T_1$, are calculated by the future position prediction means 104b-1 by using (Expression 1) and (Expression 2) below, respectively.

$$\vec{r}_r(T_2) = \vec{r}_r(T_1 + \Delta T_s) = \vec{r}_r(T_1) + \vec{v}_r(T_1)\Delta T_s \quad \text{(Expression 1)}$$

$$\vec{r}_h(T_2) = \vec{r}_h(T_1 + \Delta T_s) = \vec{r}_h(T_1) + \vec{v}_h(T_1)\Delta T_s \quad \text{(Expression 2)}$$

In the expressions above, $\Delta T_s$ is an allowed time including a processing time between when the autonomous locomotion apparatus 1 detects the person 7 and when the autonomous locomotion apparatus 1 starts either of the guide operation and the avoiding operation.

The respective positions of the autonomous locomotion apparatus 1 and the person 7 after the allowed time $\Delta T_s$ are calculated by the future position prediction means 104b-1, and then, the imminent contact risk judgment means 104b-2 judges the presence or absence of contact between the person 7 and the autonomous locomotion apparatus 1.

Figure 8:
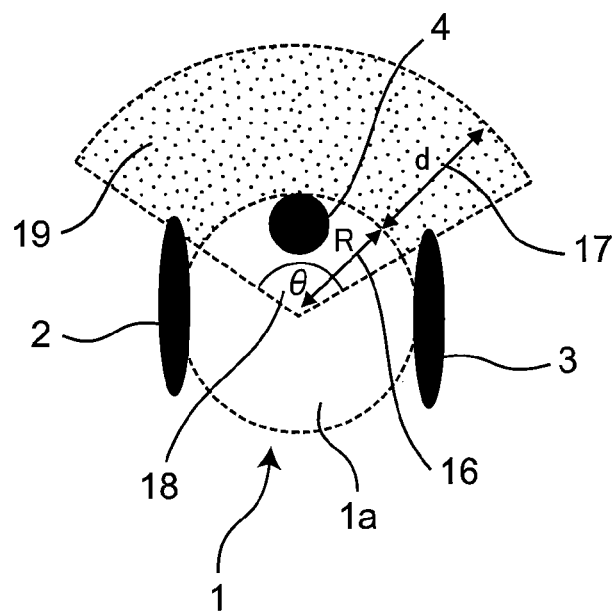
FIG. 8 is an explanatory view showing an approach forbidden area of the autonomous locomotion apparatus according to the first embodiment.

FIG. 8 illustrates a criterion for judging the presence or absence of contact by the imminent contact risk judgment means 104b-2. The criterion for judgment in the first embodiment defines a circular ring-shaped approach forbidden area 19 around the autonomous locomotion apparatus 1. When the person 7 is included in the approach forbidden area 19 as the coordinates of a point(s), the imminent contact risk judgment means 104b-2 judges that contact will occur. Assuming that the autonomous locomotion apparatus 1 takes a round shape, an annular area between the circumference of the autonomous locomotion apparatus 1 and a circumference away from the circumference of the autonomous locomotion apparatus 1 by an approach forbidden distance 17 (d) is defined as the approach forbidden area 19.

Here, assuming that the autonomous locomotion apparatus 1 is the person 7, a viewing angle 18 ($\theta$) is an angle of a range enabled for the LRF sensor 4 of the autonomous locomotion apparatus 1 to observe the environment information. On the assumption that the autonomous locomotion apparatus 1 moves forward using the viewing angle 18, the rear part of the annular area around the autonomous locomotion apparatus 1 is excluded from the approach forbidden area 19.

The imminent contact risk judgment means 104b-2 judges whether the position of the person 7 predicted by the future position prediction means 104b-1 is included in the approach forbidden area 19 of the autonomous locomotion apparatus 1 at the position predicted by the future position prediction means 104b-1.

Figure 7:
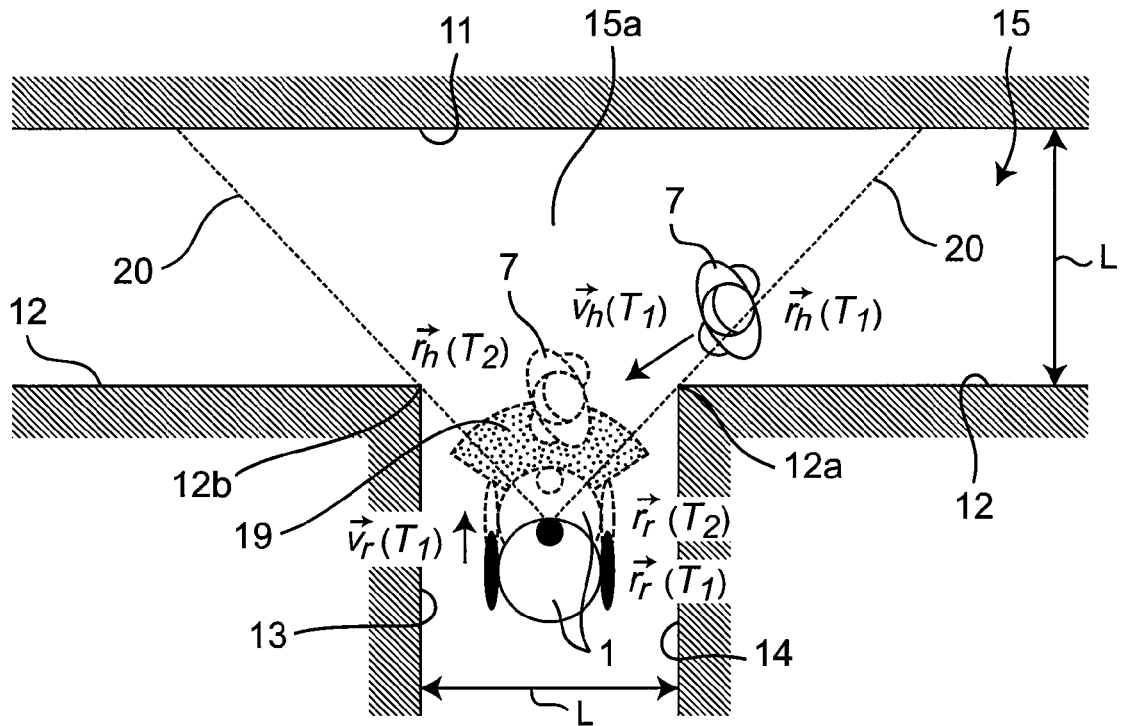
FIG. 7 is an explanatory view showing a judgment method performed by the contact probability judgment means of the autonomous locomotion apparatus according to the first embodiment.

As illustrated in FIG. 7, when it is judged by the imminent contact risk judgment means 104b-2 that the position $r_h(T_2)$ of the person 7 predicted by the future position prediction means 104b-1 is included in the approach forbidden area 19 of the autonomous locomotion apparatus 1, the autonomous locomotion apparatus 1 cannot guide the person 7 to avoid the autonomous locomotion apparatus 1 (i.e., the autonomous locomotion apparatus 1 cannot induce the person 7 to perform a movement of avoiding the autonomous locomotion apparatus 1), then, the autonomous locomotion apparatus 1 proceeds to the process of avoiding operation generation of the avoiding operation generation means 106 (to be described later). When it is judged by the imminent contact risk judgment means 104b-2 that the position $r_h(T_2)$ of the person 7 predicted by the future position prediction means 104b-1 is not included in the approach forbidden area 19 of the autonomous locomotion apparatus 1 (i.e., the autonomous locomotion apparatus 1 can induce the person 7 to perform a movement of avoiding the autonomous locomotion apparatus 1), the autonomous locomotion apparatus 1 proceeds to the process of guide operation generation of the guide operation generation means 105. In the first embodiment, it is assumed that the autonomous locomotion apparatus 1 has a radius 16 (R) of 30 cm and the viewing angle 18 ($\theta$) of 180 degrees. On the assumption that the person 7 is a circle with radius of 30 cm, the approach forbidden distance is assumed to be 30 cm.

Based on the movement information (the position, the speed, and the direction of travel) of the person 7, the guide operation generation means 105 generates information of a guide operation 26 which presents a predicted moving path of the autonomous locomotion apparatus 1 with the intention of causing the person 7 to predict.

Figure 9:
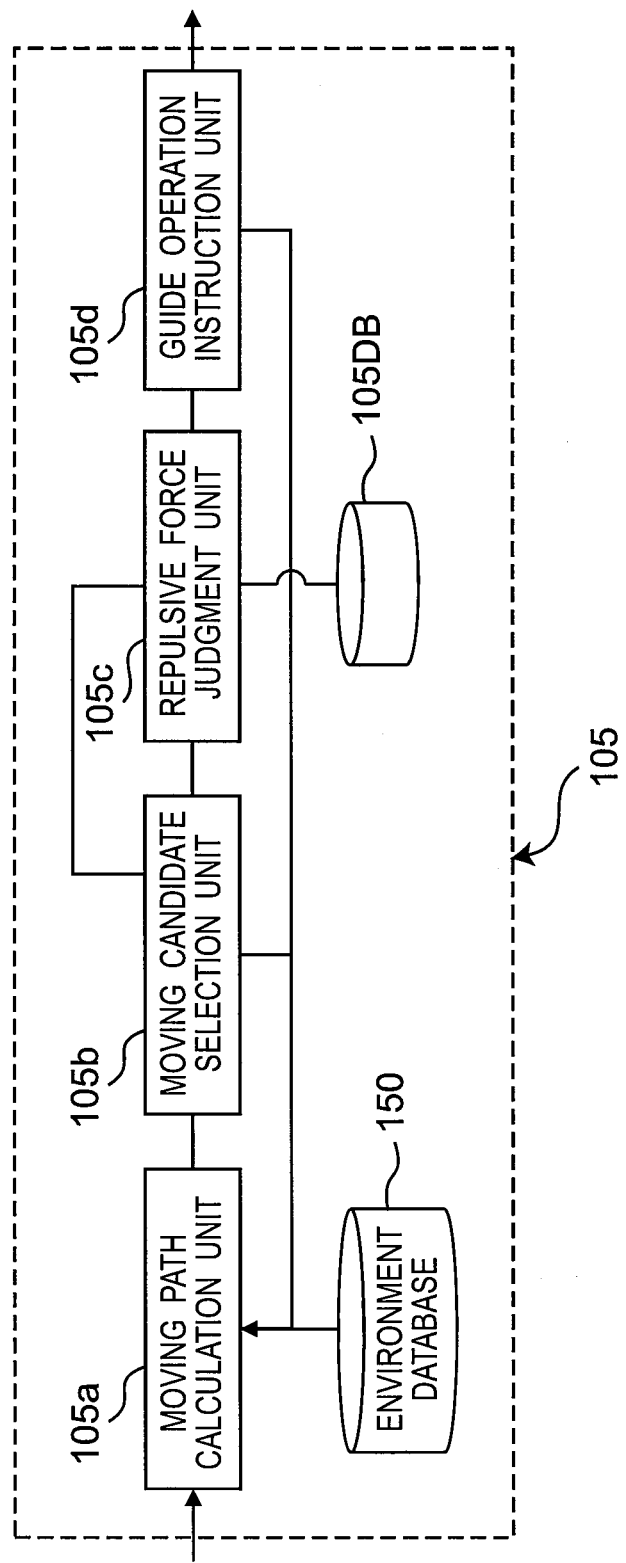
FIG. 9 is a detailed block diagram of a guide operation generation means of the autonomous locomotion apparatus according to the first embodiment.

As illustrated in FIG. 9, the guide operation generation means 105 includes a moving path calculation means (a moving path calculation unit) 105a, a moving candidate selection means (a moving candidate selection unit) 105b, a repulsive force judgment means (a repulsive force judgment unit) 105c, a guide operation instruction means (a guide operation instruction unit) 105d, and a database for generating guide operation (a storage unit for generating guide operation) 105DB.

The moving path calculation means 105a calculates a plurality of moving paths according to the environment in which the autonomous locomotion apparatus 1 is traveling. After the calculation, the moving path calculation means 105a decides priorities of the respective moving paths in selection. In order to calculate the plurality of moving paths, the moving path calculation means 105a divides the passage 15 in which the autonomous locomotion apparatus 1 is traveling into n number of regions. The number n is decided by (Expression 3) below.

$$n = \left\lfloor \frac{L}{d} \right\rfloor \quad \text{(Expression 3)}$$

In the above expression, L represents the width of the passage 15, d represents the width of the autonomous locomotion apparatus 1, n represents an integer of 1 or more, and decimals are omitted.

Figure 10A:
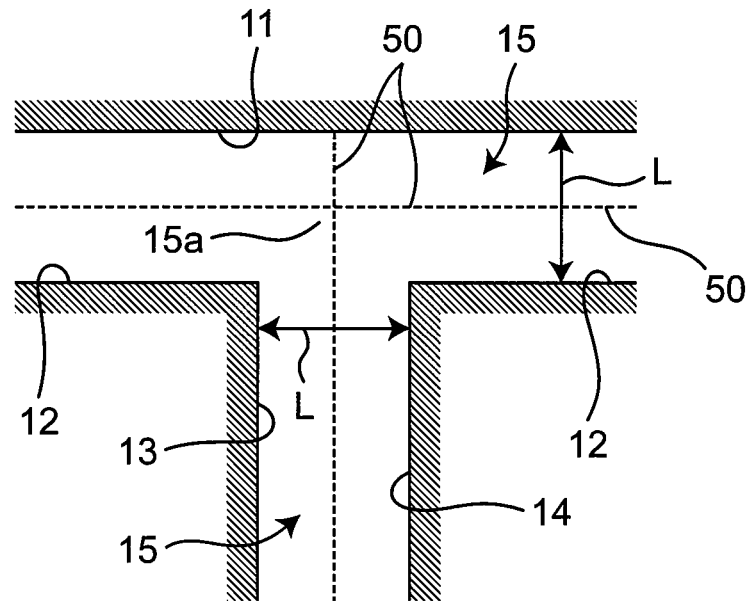
FIG. 10A is a view illustrating region division of a passage in generating a plurality of moving paths in the first embodiment.
Figure 11A:
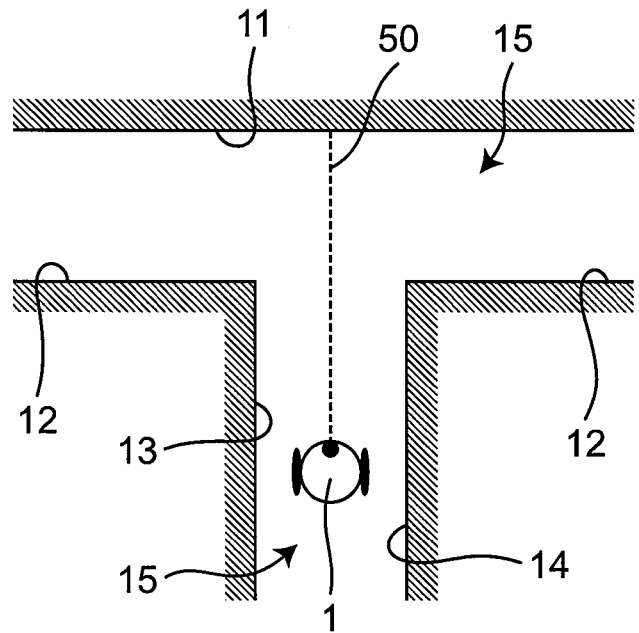
FIG. 11A is a view illustrating the region division in the case where the autonomous locomotion apparatus is traveling in a passage in the first embodiment.

In the first embodiment, since L is 150 cm and d is 60 cm, n is 2 (see FIG. 10A). Here, the cases are handled as two separate cases where the autonomous locomotion apparatus 1 is traveling in a single passage (see FIG. 11A) and where the autonomous locomotion apparatus 1 is traveling near an intersection 15a of a T-junction 15 (see FIG. 12A). When the autonomous locomotion apparatus 1 is traveling in a passage, two moving regions are possible (a right side moving path (a first moving path in the case where the autonomous locomotion apparatus 1 is traveling in a passage) 51 and a left side moving path (a second moving path in the case where the autonomous locomotion apparatus 1 is traveling in a passage) 52) (see FIGS. 11B and 11C). When the autonomous locomotion apparatus 1 is traveling near the intersection 15a of the T-junction 15, four moving regions are possible (a short detour moving path (a first moving path in the case where the autonomous locomotion apparatus 1 is traveling near the T-junction) 53, a long detour moving path (a second moving path in the case where the autonomous locomotion apparatus 1

1 is traveling near the T-junction) 54, a short evacuation moving path (a third moving path in the case where the autonomous locomotion apparatus 1 is traveling near the T-junction) 55, and a long evacuation moving path (a fourth moving path in the case where the autonomous locomotion apparatus 1 is traveling near the T-junction) 56) (see FIGS. 12B to 12E).

Based on the operational efficiency of the autonomous locomotion apparatus 1, the moving path calculation means 105*a* decides priorities of the plurality of moving paths. First, the moving path calculation means 105*a* judges whether the moving path brings the autonomous locomotion apparatus 1 close to the goal 10 or away from the goal 10. Next, the moving path calculation means 105*a* judges the length of the moving path for the autonomous locomotion apparatus 1 to reach the goal 10. The moving path of the highest operational efficiency is the moving path which brings the autonomous locomotion apparatus 1 close to the goal 10 and which has the shortest length for the autonomous locomotion apparatus 1 to reach the goal 10.

Figure 11B:
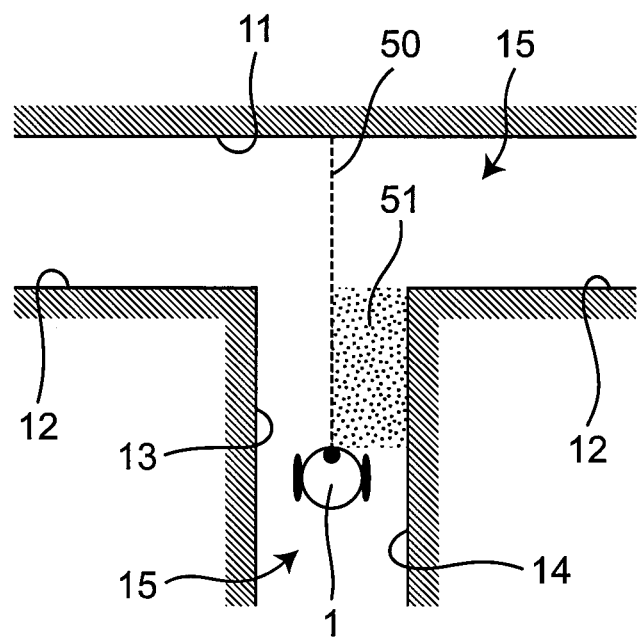
FIG. 11B is a view illustrating a first moving path in the case where the autonomous locomotion apparatus is traveling in a passage in the first embodiment.
Figure 11C:
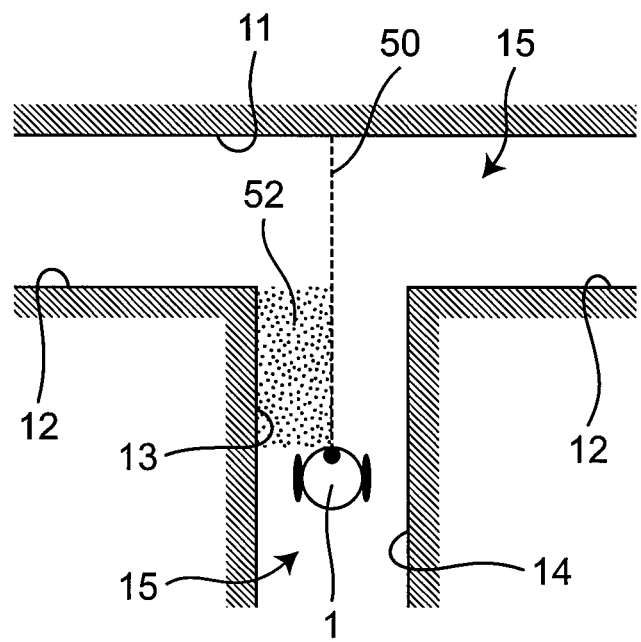
FIG. 11C is a view illustrating a second moving path in the case where the autonomous locomotion apparatus is traveling in the passage in the first embodiment.
Figure 12A:
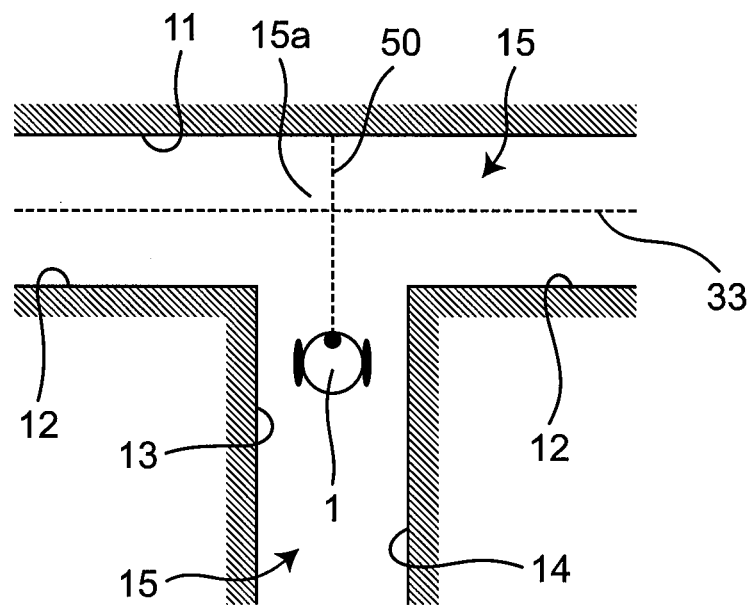
FIG. 12A is a view illustrating the region division in the case where the autonomous locomotion apparatus is traveling near a T-junction in the first embodiment.

The priorities of the moving paths in the case where the autonomous locomotion apparatus 1 is traveling in a passage are worked out by the moving path calculation means 105*a*. The right side moving path 51 illustrated in FIG. 11B brings the autonomous locomotion apparatus 1 close to the goal 10. On the other hand, the left side moving path 52 illustrated in FIG. 11C brings the autonomous locomotion apparatus 1 away from the goal 10. Therefore, the right side moving path 51 illustrated in FIG. 11B is the first moving path and the left side moving path 52 illustrated in FIG. 11C is the second moving path.

Figure 12B:
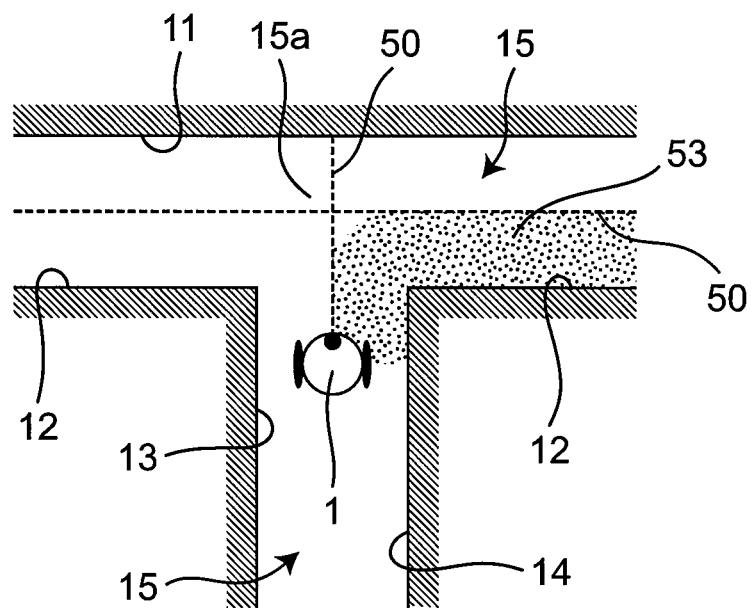
FIG. 12B is a view illustrating a first moving path in the case where the autonomous locomotion apparatus is traveling near the T-junction in the first embodiment.
Figure 12C:
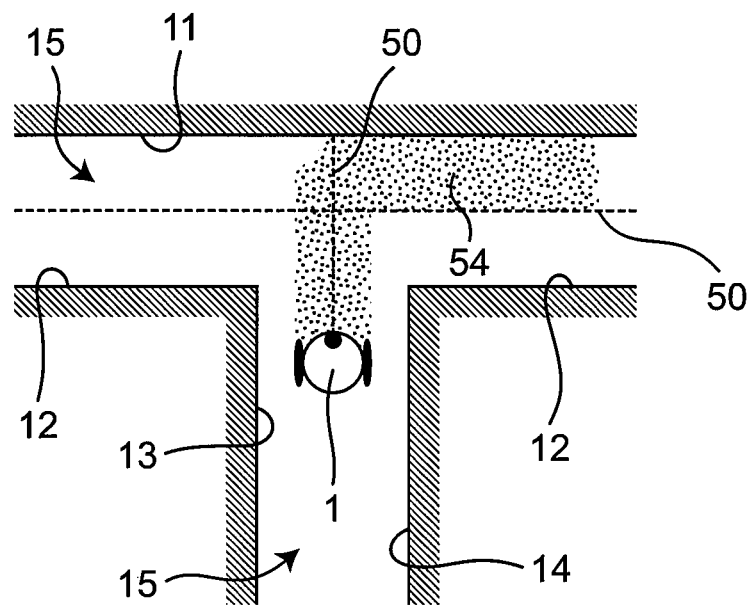
FIG. 12C is a view illustrating a second moving path in the case where the autonomous locomotion apparatus is traveling near the T-junction in the first embodiment.
Figure 12D:
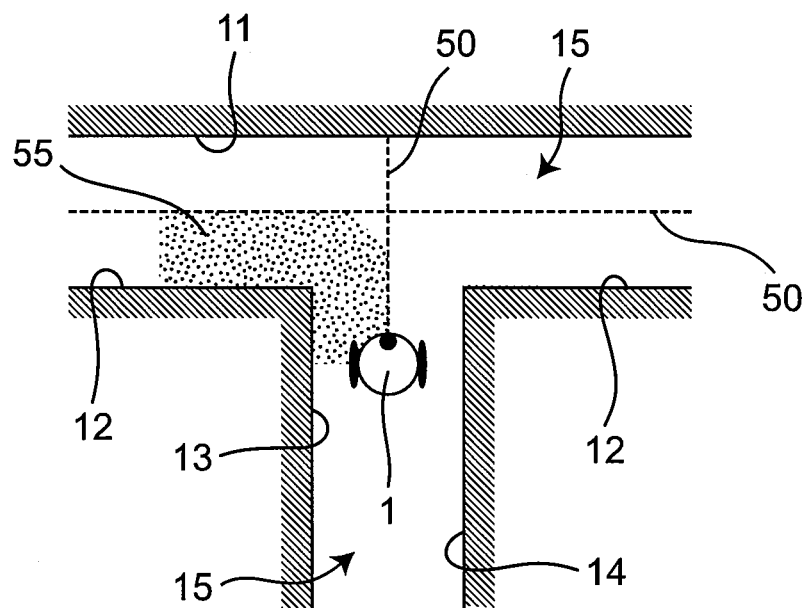
FIG. 12D is a view illustrating a third moving path in the case where the autonomous locomotion apparatus is traveling near the T-junction in the first embodiment.
Figure 12E:
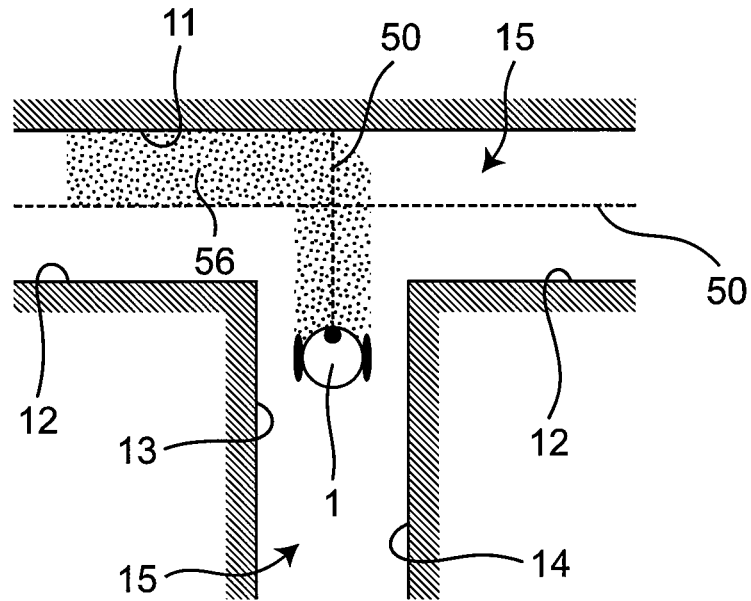
FIG. 12E is a view illustrating a fourth moving path in the case where the autonomous locomotion apparatus is traveling near the T-junction in the first embodiment.

The priorities of the moving paths in the case where the autonomous locomotion apparatus 1 is traveling near the T-junction are worked out by the moving path calculation means 105*a*. The short detour moving path 53 illustrated in FIG. 12B and the long detour moving path 54 illustrated in FIG. 12C bring the autonomous locomotion apparatus 1 close to the goal 10. On the other hand, the short evacuation moving path 55 illustrated in FIG. 12D and the long evacuation moving path 56 illustrated in FIG. 12E bring the autonomous locomotion apparatus 1 away from the goal 10. The moving path calculation means 105*a* compares the short detour moving path 53 illustrated in FIG. 12B with the long detour moving path 54 illustrated in FIG. 12C to find that the short detour moving path 53 illustrated in FIG. 12B is shorter than the long detour moving path 54 in order to reach the goal 10. Therefore, the short detour moving path 53 illustrated in FIG. 12B is the first moving path and the long detour moving path 54 illustrated in FIG. 12C is the second moving path. Similarly, the moving path calculation means 105*a* compares the short evacuation moving path 55 illustrated in FIG. 12D with the long evacuation moving path 56 illustrated in FIG. 12E to find that the short evacuation moving path 55 illustrated in FIG. 12D is shorter than the long evacuation moving path 56 in order to reach the goal 10. Therefore, the short evacuation moving path 55 illustrated in FIG. 12D is the third moving path and the long evacuation moving path 56 illustrated in FIG. 12E is the fourth moving path.

The moving candidate selection means 105*b* selects a moving candidate from the plurality of the moving paths 51 to 56 calculated in the moving path calculation means 105*a*. The moving candidate selection means 105*b* selects a moving candidate according to the orders decided by the moving path calculation means 105*a* in order to give priority to the operational efficiency of the autonomous locomotion apparatus 1. The moving candidate selection means 105*b* projects the moving candidate selected by the moving path calculation means 105*a* on the environment map 6 acquired from the environment database 150.

The repulsive force judgment means 105*c* judges whether the moving candidate selected by the moving candidate selection means 105*b* gives the person 7 a sense of uneasiness on the way to a destination. For that purpose, it is assumed that the autonomous locomotion apparatus 1 has potential 21 (a field of energy which gives repulsion to an approaching moving obstacle) and that when the autonomous locomotion apparatus 1 approaches the person 7, the person 7 receives the repulsive force $F_{rh}$ by the potential 21 of the autonomous locomotion apparatus 1 (see FIG. 13A). The repulsive force judgment means 105*c* judges whether the moving candidate selected by the moving candidate selection means 105*b* gives a sense of uneasiness to the person or not by using as a criterion the repulsive force $F_{rh}$ which the person 7 receives from the autonomous locomotion apparatus 1. When the autonomous locomotion apparatus 1 has the repulsive force $F_{rh}$ in the direction opposite to the person 7's direction of travel and the repulsive force $F_{rh}$ is larger than a predetermined value (a threshold for repulsive force judgment), the repulsive force judgment means 105*c* judges that the autonomous locomotion apparatus 1 gives the person 7 a sense of uneasiness. If not, the repulsive force judgment means 105*c* judges that the autonomous locomotion apparatus 1 does not give the person 7 a sense of uneasiness. The threshold for repulsive force judgment is stored in the database for generating guide operation (the storage unit for generating guide operation) 105DB which is connected with the repulsive force judgment means 105*c*. The threshold for repulsive force judgment may vary according to, for example, the place where the autonomous locomotion apparatus 1 is traveling. Specifically, whether the autonomous locomotion apparatus 1 is traveling on the first floor or the second floor of a hospital is judged by the self-position estimation unit 100, for example, and when the autonomous locomotion apparatus 1 is traveling on the first floor, the threshold for repulsive force judgment may be decreased, since the patients are mostly outpatients who are unfamiliar with such a robot as the autonomous locomotion apparatus 1; on the other hand, when the autonomous locomotion apparatus 1 is traveling on the second floor, the threshold for repulsive force judgment may be increased, since the patients are mostly in-patients who are familiar with such a robot as the autonomous locomotion apparatus 1. Alternatively, when the autonomous locomotion apparatus 1 travels in the daytime, the threshold for repulsive force judgment may be decreased, since the person 7 can see the autonomous locomotion apparatus 1 well; on the other hand, when the autonomous locomotion apparatus 1 travels at night-time, the threshold for repulsive force judgment may be increased, since the person 7 cannot see the autonomous locomotion apparatus 1 well. Further, the threshold for repulsive force judgment may be changed between the place where a lot of people are present and the place where a few people are present. That is, the threshold for repulsive force judgment may be changed by the repulsive force judgment means 105*c* for use, based on location information input from the self-position estimation unit 100.

Figure 13A:
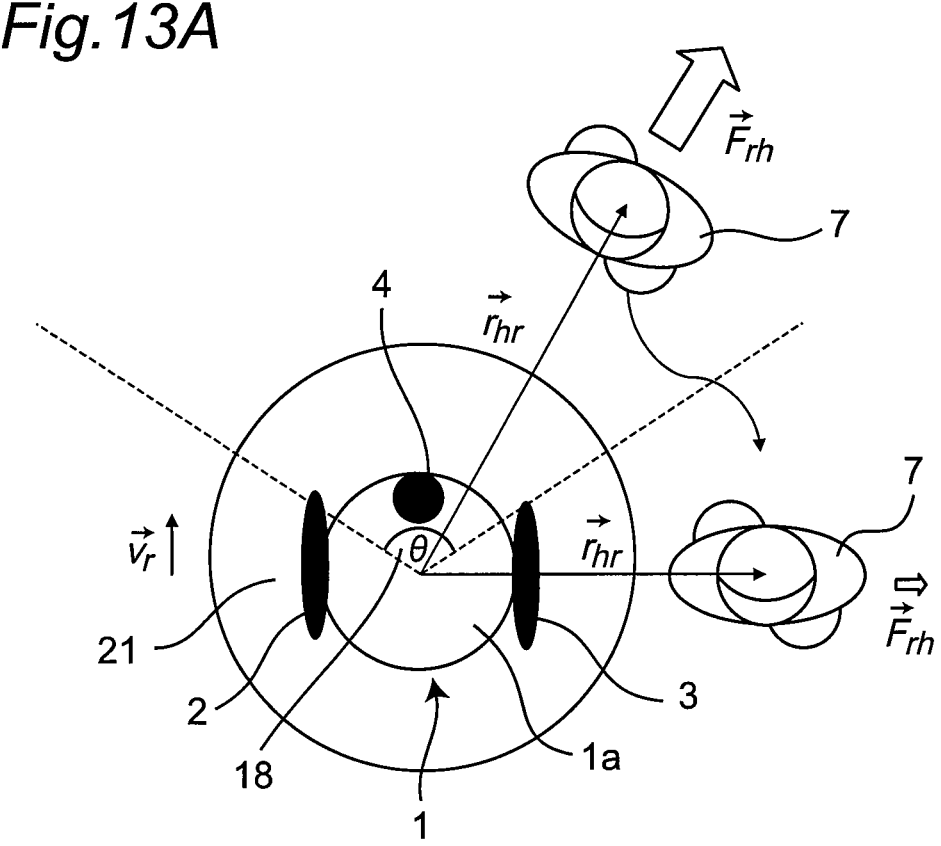
FIG. 13A is an explanatory view showing a repulsive force applied to a person by potential of the autonomous locomotion apparatus in the first embodiment.
Figure 13B:
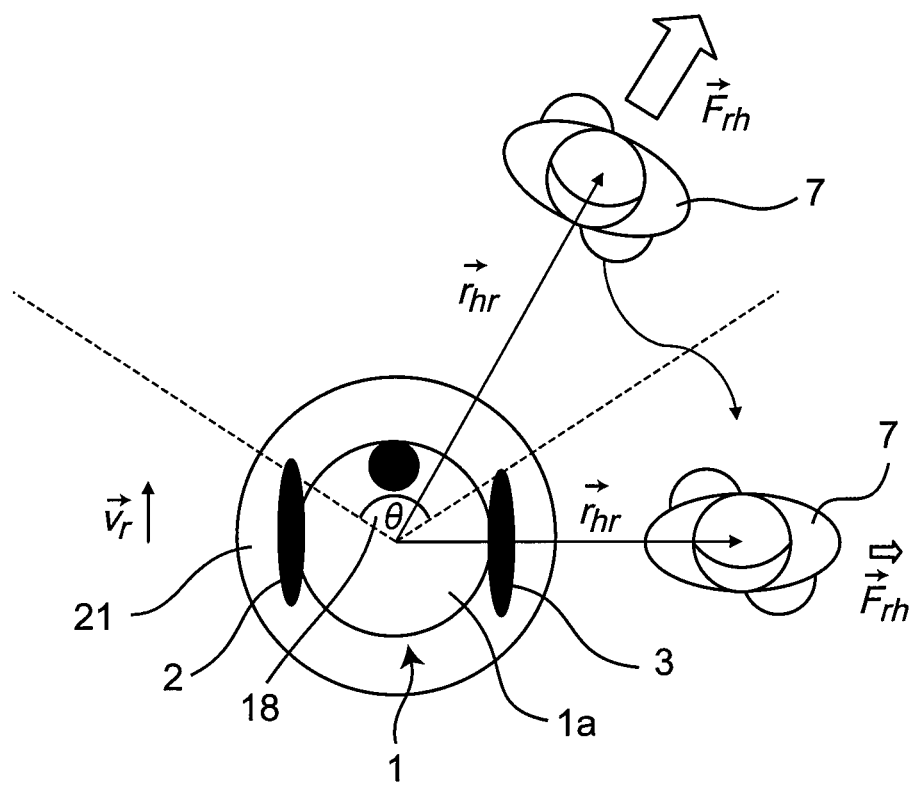
FIG. 13B is an explanatory view showing the repulsive force applied to the person by potential of the autonomous locomotion apparatus in the first embodiment.

Meanwhile, in FIG. 13A, the magnitude of the potential 21 may be changed according to the speed of the autonomous locomotion apparatus 1. For example, as illustrated in FIG. 13B, when the speed of the autonomous locomotion apparatus 1 is slower than that in FIG. 13A, the radius of the potential 21 may be smaller. Like the threshold for repulsive force judgment, the magnitude of the potential 21 may be changed based on the location information input from the self-position estimation unit 100.

Modeling the potential 21 of the autonomous locomotion apparatus 1 and the repulsive force given to the person 7 will be described below by using Social Force Model (see D. Helbing and P. Molnar "Social Force Model for Pedestrian Dynamics" Physical Review E, vol. 51, no. 5, pp. 4282-4286, 1995) (Non-Patent Literature 1)

Based on the Social Force Model, it is assumed that the position and the speed of the autonomous locomotion apparatus 1 at time t are $r_r(t)$ and $v_r(t)$, respectively, and the position and the speed of the person 7 at time t are $r_h(t)$ and $v_h(t)$, respectively. The potential 21 of the autonomous locomotion apparatus 1 at the time point (i.e., $V_{hr}(b)$) is defined by (Expression 4) below.

$$V_{hr}(b)=V_{hr}°\exp(-b/\sigma) \quad \text{(Expression 4)}$$

Figure 31:
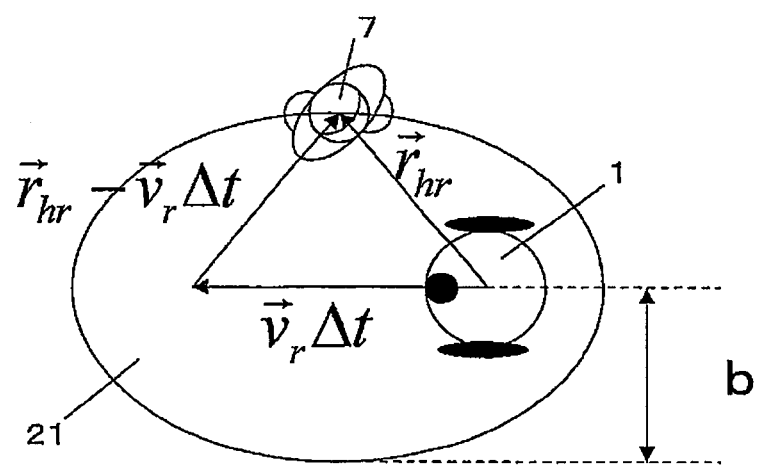
FIG. 31 is an explanatory view showing a case where an equipotential line is oval in the direction of travel of the autonomous locomotion apparatus in the first embodiment.

In the above expression, $V°_{hr}$ and $\sigma$ represent constants which determine the shape of the potential 21. It is assumed that the potential 21 of the autonomous locomotion apparatus 1 is a monotonically decreasing function with respect to b, and an equipotential line is oval in the direction of travel of the autonomous locomotion apparatus 1. b is a minor axis of the oval (see FIG. 31) and is defined by (Expression 5) below.

$$2b=\sqrt{(\|\vec{r}_{hr}\|+\|\vec{r}_{hr}-\vec{v}_r\Delta t\|)^2-(\|\vec{v}_r\|\Delta t)^2} \quad \text{(Expression 5)}$$

$r_{hr}$ in (Expression 5) is defined by (Expression 6) below.

$$\vec{r}_{hr}(t)=\vec{r}_h(t)-\vec{r}_r(t) \quad \text{(Expression 6)}$$

The repulsive force $F_{rh}(t)$ applied to the person 7 by the potential 21 of the autonomous locomotion apparatus 1 at the time t is calculated by (Expression 7) below.

$$\vec{F}_{hr}(t)=-\nabla_{\vec{r}_{hr}}V_{hr}[b(\vec{r}_{hr}(t))]\times w(\vec{e}_r,\vec{r}_{hr}) \quad \text{(Expression 7)}$$

As shown in (Expression 7), weighting can be performed on the repulsive force to increase the repulsive force when the person 7 enters the viewing angle 18 of the autonomous locomotion apparatus 1 and to decrease the repulsive force in the otherwise case. The weight w is expressed by (Expression 8) below.

$$w(\vec{e}_r,\vec{r}_{hr})=\begin{cases} 1 & \text{if } (\vec{e}_r\cdot\vec{r}_{hr}\geq\|\vec{r}_{hr}\|\cos\theta) \\ c & \text{otherwise} \end{cases} \quad \text{(Expression 8)}$$

In the above expression, c represents a constant which satisfies 0<c<1, θ represents a constant representing the viewing angle 18, and $e_r$ represents a unit vector representing the direction of travel of the autonomous locomotion apparatus 1, which can be expressed by (Expression 9) below.

$$\vec{e}_r=\frac{\vec{v}_r(t)}{\|\vec{v}_r(t)\|} \quad \text{(Expression 9)}$$

The guide operation instruction means 105d determines the moving candidate which is judged by the repulsive force judgment means 105c not to give the person 7 a sense of uneasiness, as the predicted moving path of the autonomous locomotion apparatus 1 which is intended to cause the person 7 to predict.

Next, an operation to present the moving path of the autonomous locomotion apparatus 1 which is intended to cause the person 7 to predict is determined by the guide operation instruction means 105d, and information of the guide operation is generated by the guide operation instruction means 105d.

Figure 14:
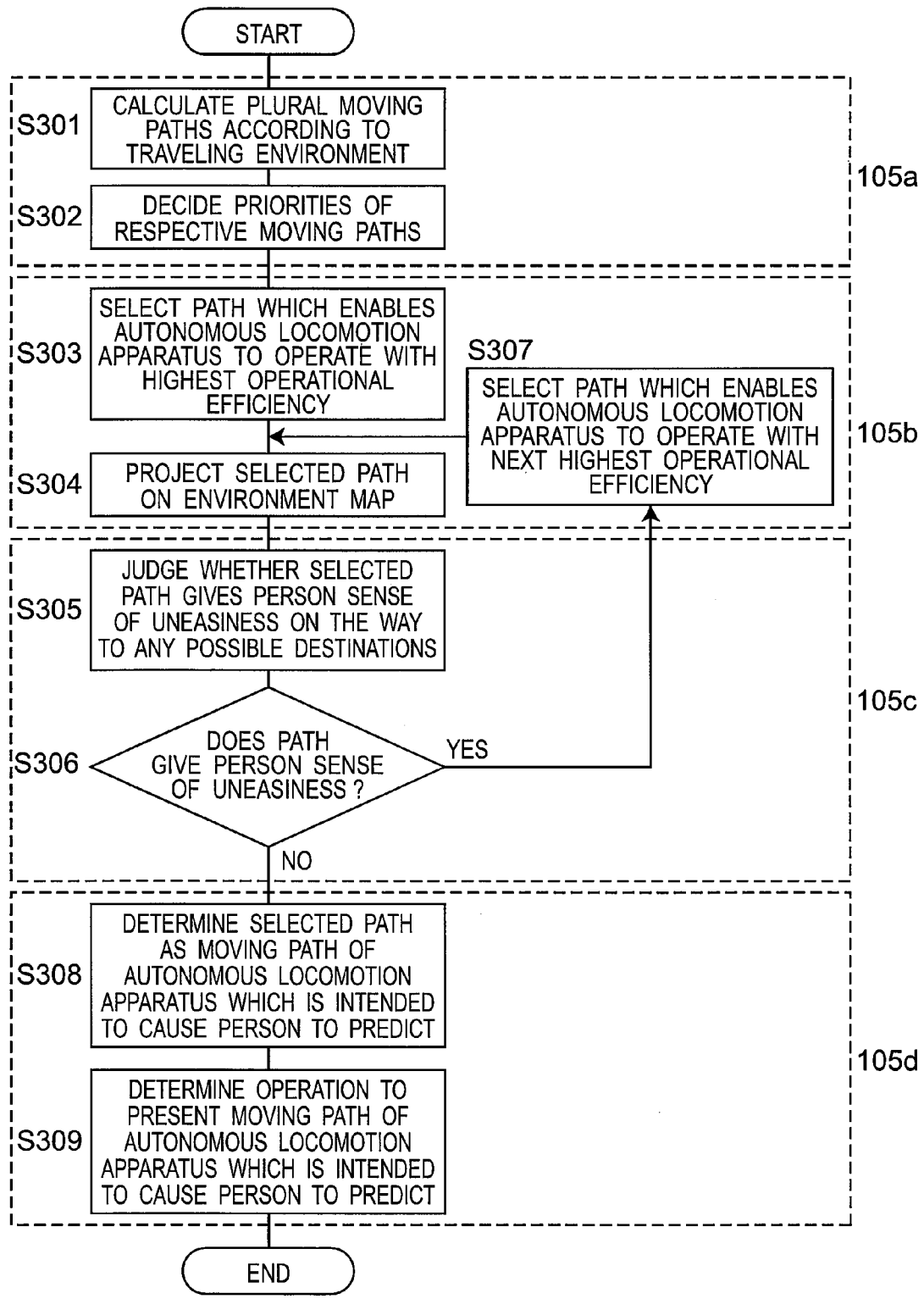
FIG. 14 is a flowchart describing an operating procedure of the guide operation generation means of the autonomous locomotion apparatus according to the first embodiment.

FIG. 14 is a flowchart of the process of guide operation generation of the guide operation generation means 105.

First, in step S301, the guide operation generation means 105 calculates a plurality of moving paths by the moving path calculation means 105a according to the environment in which the autonomous locomotion apparatus 1 is traveling.

Next, in step S302, priorities of the respective moving paths are decided by the moving path calculation means 105a.

Next, in step S303, a path which enables the autonomous locomotion apparatus 1 to operate with the highest operational efficiency (the first candidate path) is selected from among the plurality of moving paths by the moving candidate selection means 105b.

Next, in step S304, the selected path is drawn in the environment map 6 by moving candidate selection means 105b.

Next, in steps S305 and S306, whether the candidate of the first candidate moving path gives the person 7 a sense of uneasiness on the way to a destination is judged by the repulsive force judgment means 105c. When it is judged by the repulsive force judgment means 105c that the candidate of the moving path gives the person 7 a sense of uneasiness, the process proceeds to step S307. In step S307, a moving path which enables the autonomous locomotion apparatus 1 to operate with the next highest operational efficiency is selected by the moving candidate selection means 105b, then after step S304, the repulsive force is judged for the selected moving path in step S305 again.

On the other hand, when it is judged by the repulsive force judgment means 105c that the candidate of the moving path does not give the person 7 a sense of uneasiness in steps S305 and S306, the process proceeds to step S308.

In step S308, the candidate of the moving path is determined by the guide operation instruction means 105d, as the predicted moving path of the autonomous locomotion apparatus 1 which is intended to cause the person 7 to predict.

Next, in step S309, an operation to present the predicted moving path of the autonomous locomotion apparatus 1 which is intended to cause the person 7 to predict is determined by the guide operation instruction means 105d, and information of the guide operation for presenting the predicted moving path is generated by the guide operation instruction means 105d. The guide operation represents an operation for presenting the moving path of the autonomous locomotion apparatus 1 to the person 7 (i.e., for blocking up the moving path of the autonomous locomotion apparatus 1), which is, for example, an operation for the autonomous locomotion apparatus 1 to indicate to the person 7 that the autonomous locomotion apparatus 1 is going to travel along a wall through such movement of the autonomous locomotion apparatus 1 as turning to one of the walls on both sides of the autonomous locomotion apparatus 1 while moving along the walls and then approaching the wall.

Then, a series of processes is finished.

Methods of generating the guide operation in various cases will be described below by using several examples.

EXAMPLE 1

A Pattern of the Person 7 Who has a Well-Defined Destination

Figure 15:
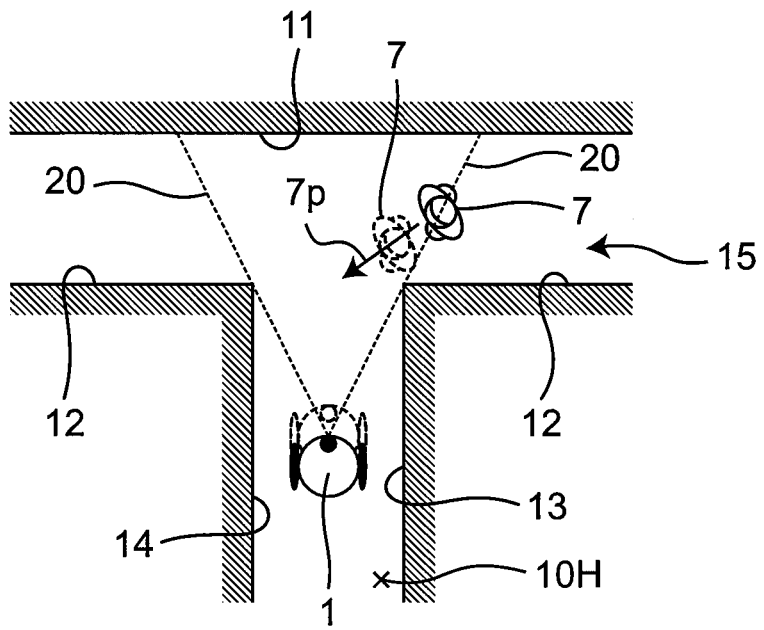
FIG. 15 is an explanatory view showing a first example of a scene of the autonomous locomotion apparatus in the first embodiment which has detected a person.
Figure 16:
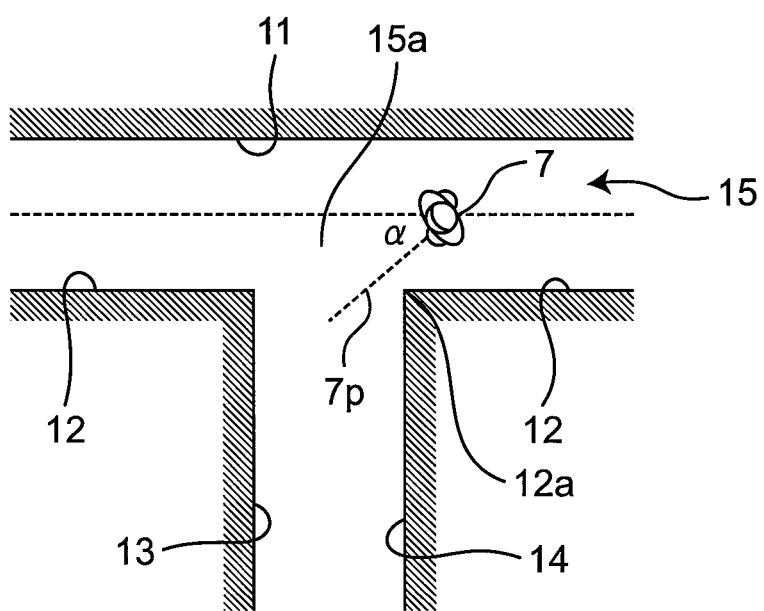
FIG. 16 is an explanatory view showing an angle of a direction of travel of a person when it is judged that the person is to turn left in the first embodiment.

FIG. 15 illustrates an example in which the person 7's destination is well-defined when the person 7 enters the detectable range within the sensing boundary 20 of the autonomous locomotion apparatus 1 and is detected by the autonomous locomotion apparatus 1. In FIG. 15, whether the person 7 is to turn left is judged by the human information acquisition means 103 based on an angle α of the direction of travel 7p of the person 7. In order to find the angle of the direction of travel of the person 7 by the human information acquisition means 103, the angle formed by the direction of travel 7p of the person 7 with a line parallel to the wall 11 or 12 which is near to the moving path of the person 7 is measured by the human information acquisition means 103 (see FIG. 16). The threshold of the angle α for judging that the person 7 is to turn left may be assumed that the direction of travel of the person 7 forms an angle of 20 degrees leftward with a parallel line of the wall 11 illustrated in the upper side of FIG. 16, for example, and stored in the internal storage unit of the human information acquisition means 103 in advance or stored in such a database as the environment database 150, so that the threshold will be accessed and retrieved as required.

Figure 17A:
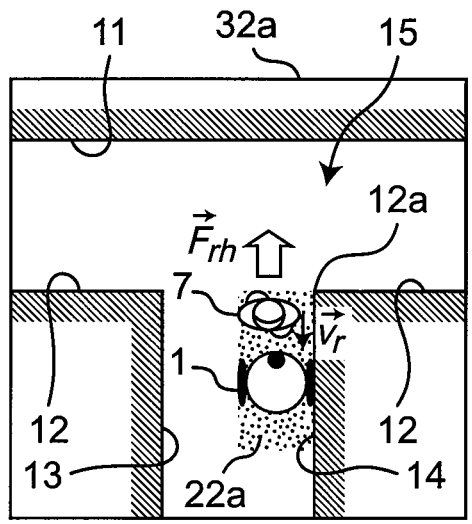
FIG. 17A is an explanatory view showing a map of a first candidate moving path of the autonomous locomotion apparatus which is drawn by the guide operation generation means of the autonomous locomotion apparatus with the intention of causing a person to predict in the first example of the first embodiment.

Here, it is assumed that the person 7 takes the shortest path toward his goal 10H (see FIG. 17A). Accordingly, it is also assumed that when the person 7 is to turn left, the person 7 does a turn near a corner 12a of the lower sidewall, then, takes a path along the right wall 14.

When the autonomous locomotion apparatus 1 detects the person 7, the predicted moving path of the autonomous locomotion apparatus 1 is determined with respect to the person 7 by the guide operation instruction means 105d of the guide operation generation means 105.

Specifically, as illustrated in FIG. 17A, the path for the autonomous locomotion apparatus 1 to travel along the right wall 14, that is, the moving path of a first candidate (the first candidate of the predicted moving path in <Example 1: a pattern of the person who has a well-defined destination>) 22a, is selected by the moving candidate selection means 105b as the moving path of the highest operational efficiency calculated by the moving path calculation means 105a. Then, the moving path of a first candidate is projected on the environment map (the map of the first candidate of the predicted moving path in <Example 1: a pattern of the person who has a well-defined destination>) 32a (Although the map is the environment map 6 retrieved from the environment database 150, the environment map in the state of FIG. 17A is described with the reference code 32a here. The same applies hereinafter, as the environment maps in the corresponding states will be described with different reference codes.) by the moving candidate selection means 105b. Then, the position of the autonomous locomotion apparatus 1 and the position of the person 7 who is turning left are estimated by the self-position estimation unit 100 and the human information acquisition means 103 by a predetermined time interval from time 0 to time $T_{max}$ (here, the time at which the autonomous locomotion apparatus 1 and the person 7 make the closest approach to each other is $T_{max}$) Based on the estimated positions from time 0 to time $T_{max}$, $T_{max}$ at which the autonomous locomotion apparatus 1 and the person 7 make the closest approach to each other is calculated by the human information acquisition means 103. The repulsive force judgment is performed by the repulsive force judgment means 105c with respect to the position of the autonomous locomotion apparatus 1 and the position of the person 7 at the time.

As illustrated in FIG. 17A, the repulsive force $F_{rh}$ which is larger than the threshold for repulsive force judgment is applied to the person 7 in the direction opposite to the direction of travel of the person 7 by the potential 21 of the autonomous locomotion apparatus 1 which is traveling along the first candidate of the moving path 22a. Then, a second candidate of a moving path (the second candidate of the predicted moving path in <Example 1: a pattern of the person who has a well-defined destination>) 22b of the autonomous locomotion apparatus 1 is selected by the moving candidate selection means 105b as a path along the left wall 13 which enables the autonomous locomotion apparatus 1 to operate with the next highest operational efficiency, and projected on the environment map 33b by the moving candidate selection means 105b (see the map of FIG. 17B (the map of the second candidate of the predicted moving path in <Example 1: a pattern of the person who has a well-defined destination>) 32b). In that case, since the person 7 receives the repulsive force $F_{rh}$ only from the side of the autonomous locomotion apparatus 1 which has the potential 21 with a small weight, the value of the repulsive force $F_{rh}$ is smaller than the threshold for repulsive force judgment. As a result, the second candidate of the moving path 22b is determined by the guide operation instruction means 105d as the moving path of the autonomous locomotion apparatus 1 which is intended to cause the person 7 to predict (hereinafter, referred to as "predicted moving path").

Figure 17B:
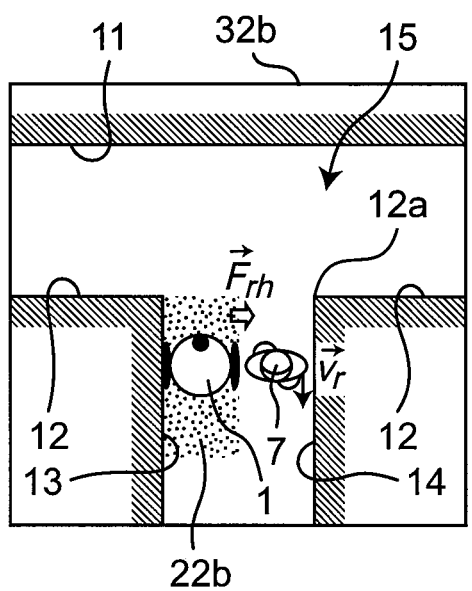
FIG. 17B is an explanatory view showing a map of a second candidate moving path of the autonomous locomotion apparatus which is drawn by the guide operation generation means of the autonomous locomotion apparatus with the intention of causing a person to predict in the first example.

In order to present the predicted moving path 22b of the autonomous locomotion apparatus 1 to the person 7, an operation of blocking up the path 22b is required. In this case, information of the operation 26 of the autonomous locomotion apparatus 1 to turn left while traveling ahead to cause the autonomous locomotion apparatus 1 to approach the left wall 13 of FIG. 17B is generated by the guide operation generation means 105; and based on the generated information of the guide operation, motion control is performed by the traveling speed and rotational speed control means 107 on the motors 2M and 3M (see an arrow 26 of FIG. 17C). As a result, in the scene illustrated in FIG. 17C, from the guide operation 26 to cause the autonomous locomotion apparatus 1 to approach the left wall 13, the person 7 becomes aware that there will be a space at the right wall 14 side and be able to walk by the right wall 14 without anxiety (see the path indicated by an arrow 126 of FIG. 17D along which the person 7 can walk without anxiety).

EXAMPLE 2

A Pattern of the Person 7 Who has a Well-Defined Destination

Figure 18:
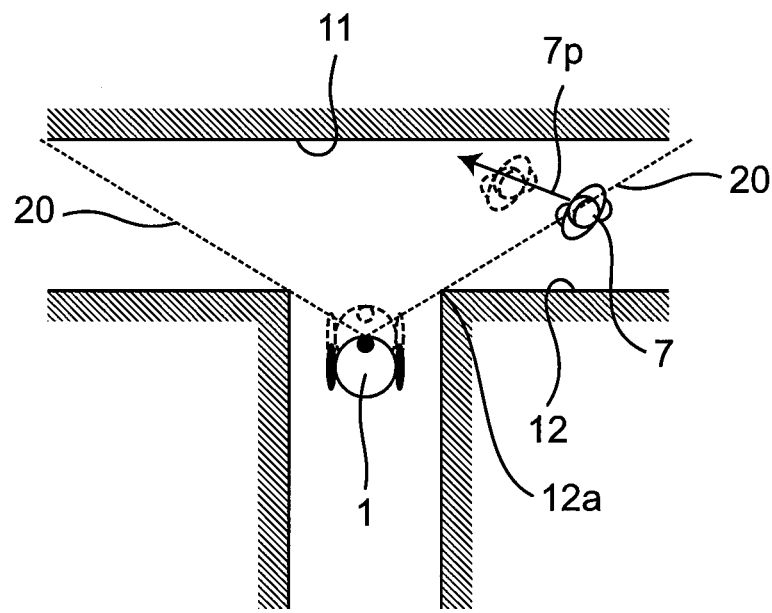
FIG. 18 is an explanatory view showing a second example of the of the autonomous locomotion apparatus which has detected a person.

FIG. 18 also illustrates an example in which the person 7's destination is well-defined when the person 7 enters the detectable range within the sensing boundary 20 of the autonomous locomotion apparatus 1 and is detected by the autonomous locomotion apparatus 1. In FIG. 18, since the person 7 is walking toward the wall 11 illustrated in the upper side of FIG. 18 instead of walking straight ahead near the intersection 15a of the T-junction 15, the person 7 is not likely to turn left at the intersection 15a. Therefore, from the angle α of the direction of travel 7p of the person 7, it is understood that the person 7 intends to walk straight through the passage 15. In that case, the threshold of the angle α for judging that the person 7 will walk straight is, for example, 20 degrees formed by the direction of travel 7p of the person 7 rightward with the parallel line of the wall 11 illustrated in the upper side.

When the autonomous locomotion apparatus 1 detects the person 7, the predicted moving path is determined by the guide operation instruction means 105d.

Figure 19A:
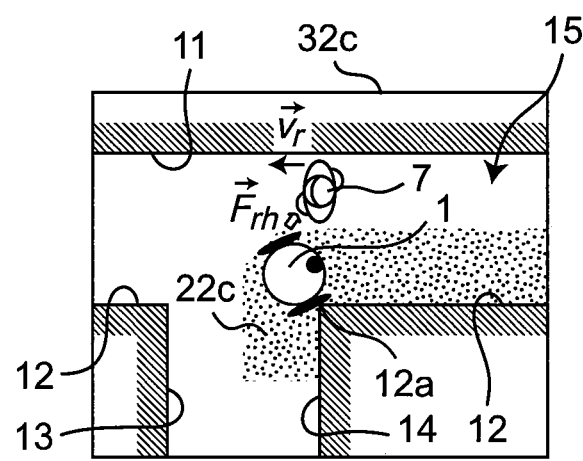
FIG. 19A is an explanatory view showing a map of a first candidate moving path of the autonomous locomotion apparatus which is drawn by the guide operation generation means of the autonomous locomotion apparatus with the intention of causing a person to predict in the second example of the first embodiment.

Specifically, as illustrated in FIG. 19A, the first candidate of the moving path which causes the autonomous locomotion apparatus 1 to travel along the right wall 14 and then turn right at the corner 12a to travel along the wall 12 illustrated in the lower side of FIG. 19A (the first candidate of the predicted moving path in <Example 2: a pattern of the person who has a well-defined destination>) 22c is selected by the moving candidate selection means 105b as the path which enables the autonomous locomotion apparatus 1 to operate with the highest operational efficiency, and projected on the environment map (the map of the first candidate of the predicted moving path in <Example 2: a pattern of the person who has a well-defined destination>) 32c by the moving candidate selection means 105b. Then, the position of the autonomous locomotion apparatus 1 and the position of the person 7 who is moving straight ahead along the wall 11 illustrated in the upper side of the figure are estimated by the self-position estimation unit 100 and the human information acquisition means 103 by a predetermined time interval from time 0 to time $T_{max}$. Based on the estimated positions from time 0 to time $T_{max}$, the time $T_{max}$ at which the autonomous locomotion apparatus 1 and the person 7 make the closest approach to each other is calculated by the human information acquisition means 103. The repulsive force judgment is performed by the repulsive force judgment means 105c with respect to the position of the autonomous locomotion apparatus 1 and the position of the person 7 at the time $T_{max}$.

Figure 19B:
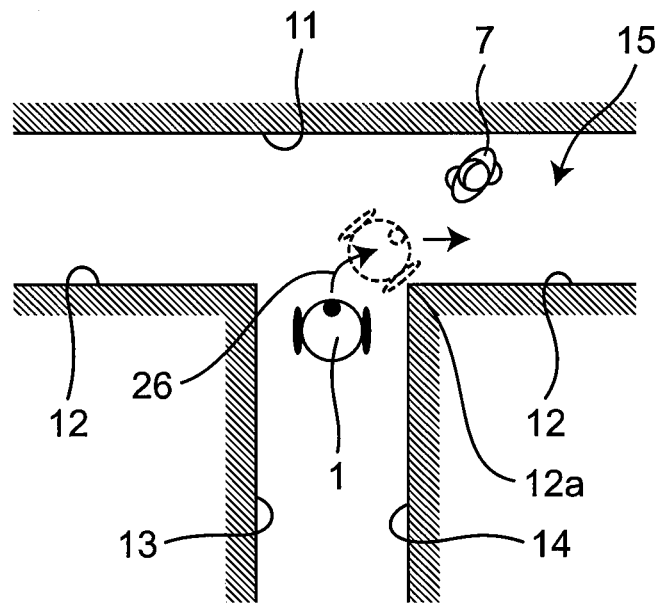
FIG. 19B is an explanatory view showing a guide operation which is generated by the guide operation generation means of the autonomous locomotion apparatus to present a moving path of the autonomous locomotion apparatus with the intention of causing the person to predict in the second example.

In that case, since the repulsive force $F_{rh}$ received by the person 7 is smaller than the threshold for repulsive force judgment, the first candidate of the moving path 22c is determined by the guide operation instruction means 105d as the predicted moving path. In order to block up the first candidate of the moving path 22c, the autonomous locomotion apparatus 1 generates information of the guide operation 26 to cause the autonomous locomotion apparatus 1 to gradually approach the right wall 14 and then turn right at the corner 12a, by the guide operation generation means 105, and based on the generated information of the guide operation, performs the motion control on the motors 2M and 3M by the traveling speed and rotational speed control means 107 (see FIG. 19B). At this moment, the autonomous locomotion apparatus 1 performs the motion control on the motors 2M and 3M by the traveling speed and rotational speed control means 107 to turn the corner by stopping the right wheel 3 for a short time near the corner 12a and causing the left wheel 2 to largely turn.

EXAMPLE 3

A Pattern of the Person 7 with his Destination Still Undefined

Figure 20:
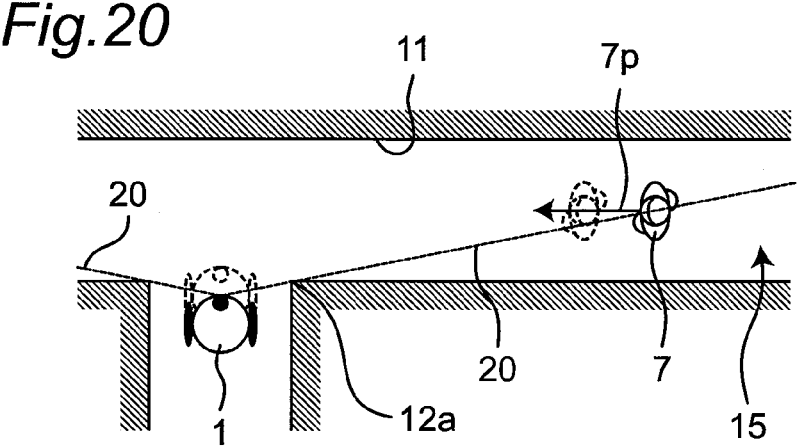
FIG. 20 is an explanatory view showing a third example of the scene of the autonomous locomotion apparatus which has detected a person.

FIG. 20 illustrates an example in which the person 7's destination is still undefined when the person 7 enters the detectable range within the sensing boundary 20 of the autonomous locomotion apparatus 1 and is detected by the autonomous locomotion apparatus 1. Since the person 7 has not reached the intersection 15a of the T-junction 15 when the person 7 is detected by the autonomous locomotion apparatus 1, the person 7 is still keeping the person's direction of travel 7p straight. The autonomous locomotion apparatus 1 is still unable to judge whether the person 7 is to go straight or to turn left at the intersection 15a. Here again, the autonomous locomotion apparatus 1 detects the person 7 and causes the guide operation instruction means 105d to determine the predicted moving path.

Figure 21A:
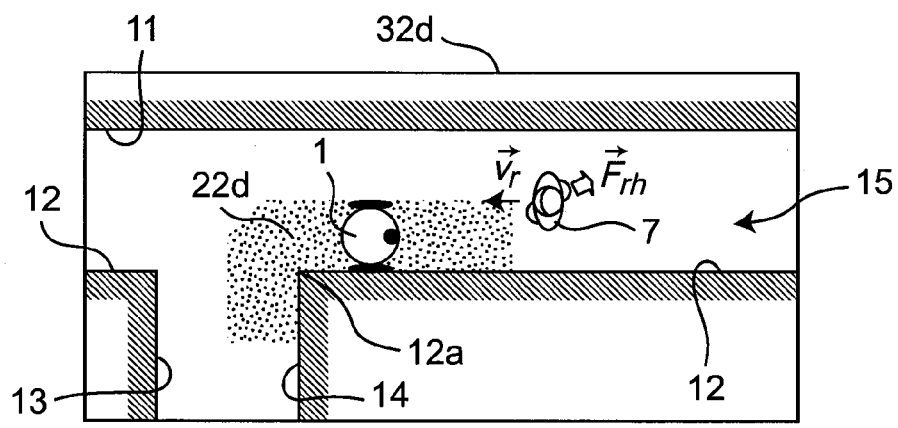
FIG. 21A is an explanatory view showing a map of a first candidate moving path of the autonomous locomotion apparatus which is drawn by the guide operation generation means of the autonomous locomotion apparatus with the intention of causing a person to predict in the third example of the first embodiment.

As illustrated in FIG. 21A, first, since the path which enables the autonomous locomotion apparatus 1 to operate with the highest operational efficiency is the path which causes the autonomous locomotion apparatus 1 to travel along the right wall 14 and then turn right at the corner 12a to travel along the wall 12 illustrated in the lower side of FIG. 21A, the candidate of the moving path (the first candidate of the predicted moving path in <Example 3: a pattern of the person 7 with his destination still undefined>) 22d is selected by the moving candidate selection means 105b and projected on the environment map (the map of the first candidate of the predicted moving path in <Example 3: a pattern of the person 7 with his destination still undefined>) 32d by the moving candidate selection means 105b. Then, the position of the autonomous locomotion apparatus 1 and the position of the person 7 are estimated by the self-position estimation unit 100 and the human information acquisition means 103 by a predetermined time interval from time 0 to time $T_{max}$. Based on the estimated positions from time 0 to time $T_{max}$ the time $T_{max}$ at which the autonomous locomotion apparatus 1 and the person 7 make the closest approach to each other is calculated by the human information acquisition means 103. The repulsive force judgment is performed by the repulsive force judgment means 105c with respect to the position of the autonomous locomotion apparatus 1 and the position of the person 7 at the time $T_{max}$. In this example, since the autonomous locomotion apparatus 1 and the person 7 are apart from each other at the moment when the autonomous locomotion apparatus 1 detects the person 7, the time when the autonomous locomotion apparatus 1 and the person 7 make the closest approach to each other is $T_{max}$.

Figure 21B:
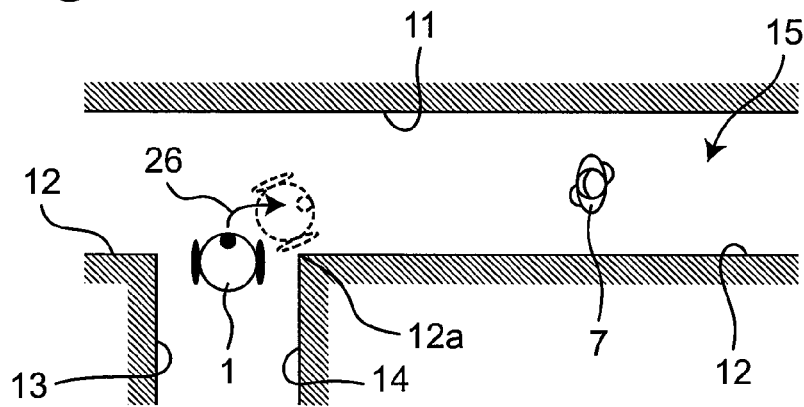
FIG. 21B is an explanatory view showing a guide operation which is generated by the guide operation generation means of the autonomous locomotion apparatus to present a moving path of the autonomous locomotion apparatus with the intention of causing the person to predict in the third example.

In this case, since the person 7 is still away from the intersection 15a of the T-junction 15, the repulsive force $F_{rh}$ received by the person 7 is smaller than the threshold for repulsive force judgment. Therefore, the candidate of the moving path 22d is determined to be the predicted moving path by the guide operation instruction means 105d. In order to block up the moving path 22d of the autonomous locomotion apparatus 1 which is intended to cause the person 7 to predict, the autonomous locomotion apparatus 1 generates information of the operation 26 to cause the autonomous locomotion apparatus 1 to gradually approach the right wall 14 and then turn right at the corner 12a, and based on the generated information of the guide operation, performs the motion control on the motors 2M and 3M by the traveling speed and rotational speed control means 107 (see FIG. 21B). At this moment, the autonomous locomotion apparatus 1 performs the motion control on the motors 2M and 3M by the traveling speed and rotational speed control means 107 to turn the corner by stopping the right wheel 3 for a short time near the corner 12a and causing the left wheel 2 to largely turn.

EXAMPLE 4

A Pattern of the Person 7 with his Destination Still Undefined

Figure 22:
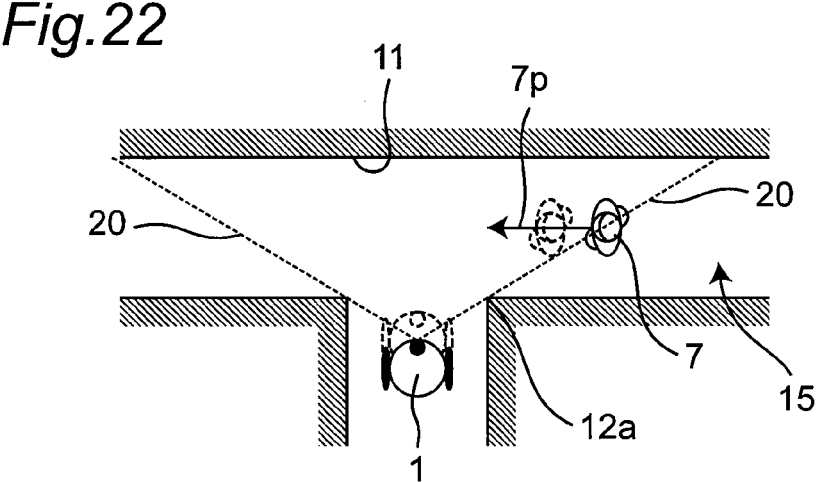
FIG. 22 is an explanatory view showing a fourth example of the scene of the autonomous locomotion apparatus which has detected a person.

FIG. 22 also illustrates an example in which the person 7's destination is still undefined when the person 7 enters the detectable range within the sensing boundary 20 of the autonomous locomotion apparatus 1 and is detected by the autonomous locomotion apparatus 1. Unlike the example of FIG. 20, the person 7 has moved to the intersection 15a of the T-junction 15 in this example. The autonomous locomotion apparatus 1 detects the person 7, and determines the predicted moving path by the guide operation instruction means 105d. First, since the path which enables the autonomous locomotion apparatus 1 to operate with the highest operational efficiency is the path which causes the autonomous locomotion apparatus 1 to travel along the right wall 14 and then turn right at the corner 12a to travel along the wall 12 illustrated in the lower side of FIG. 20, as the path, the candidate of the moving path (the first candidate of the predicted moving path in <Example 4: a pattern of the person 7 with his destination still undefined>) 22e is selected by the moving candidate selection means 105b and projected on the environment map (the map of the first candidate of the predicted moving path in <Example 4: a pattern of the person 7 with his destination still undefined>) 32e by the moving candidate selection means 105b.

Figure 23A:
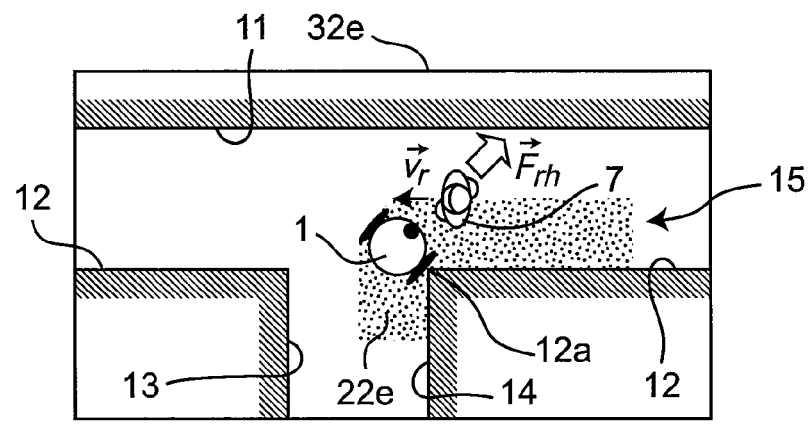
FIG. 23A is an explanatory view showing a map of a first candidate moving path of the autonomous locomotion apparatus which is drawn by the guide operation generation means of the autonomous locomotion apparatus with the intention of causing a person to predict in the fourth example of the first embodiment.
Figure 23B:
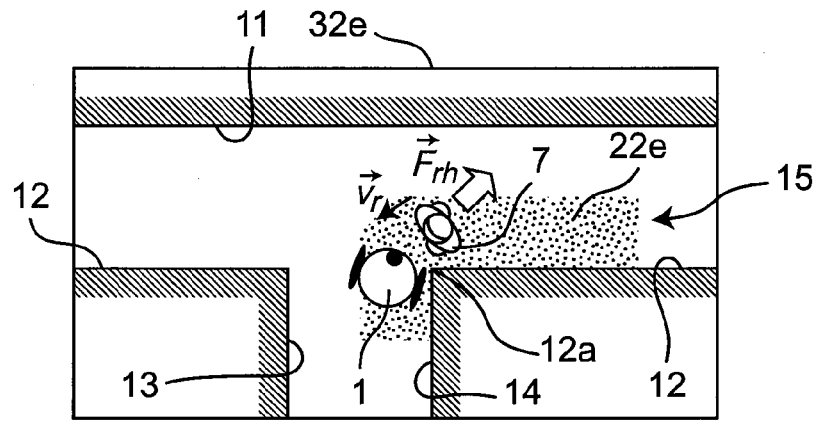
FIG. 23B is an explanatory view showing a map of a first candidate moving path of the autonomous locomotion apparatus which is drawn by the guide operation generation means of the autonomous locomotion apparatus with the intention of causing a person to predict in the fourth example.

Yet, since the person 7's destination is still undefined, the autonomous locomotion apparatus 1 has to judge both the probability of the person 7 going straight through the intersection 15a of the intersection 15 and the probability of the person 7 turning left at the intersection 15a of the intersection 15. FIG. 23A illustrates the map 32e of the first candidate of the predicted moving path when it is assumed that the person 7 is to go straight. FIG. 23B illustrates the map 32e of the first candidate of the predicted moving path when it is assumed that the person 7 is to turn left. In the respective cases, the position of the autonomous locomotion apparatus 1 and the position of the person 7 are estimated by the self-position estimation unit 100 and the human information acquisition means 103 by a predetermined time interval from time 0 to time $T_{max}$. Based on the estimated positions from time 0 to time $T_{max}$, the time $T_{max}$ at which the autonomous locomotion apparatus 1 and the person 7 make the closest approach to each other is calculated by the human information acquisition means 103. The repulsive force judgment is performed by the repulsive force judgment means 105c with respect to the position of the autonomous locomotion apparatus 1 and the position of the person 7 at the time $T_{max}$. As illustrated in FIG. 23B, in the case where the person 7 is to turn left, the repulsive force $F_{rh}$ which is larger than the threshold for repulsive force judgment is applied to the person 7 in the direction opposite to the person 7's direction of travel. Then, the candidate of the moving path which enables the autonomous locomotion apparatus 1 to operate with the next highest operational efficiency (the second candidate of the predicted moving path in <Example 4: a pattern of the person 7 with his destination still undefined>) 22f is selected.

Figure 24A:
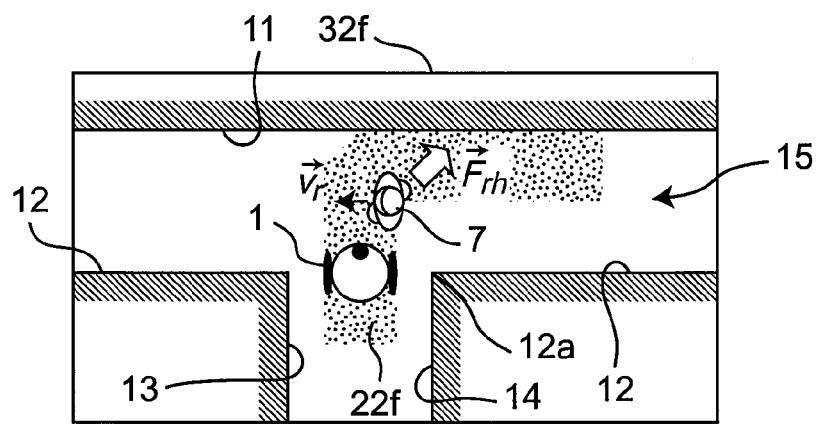
FIG. 24A is an explanatory view showing a map of a second candidate moving path of the autonomous locomotion apparatus which is drawn by the guide operation generation means of the autonomous locomotion apparatus with the intention of causing a person to predict in the fourth example.
Figure 24B:
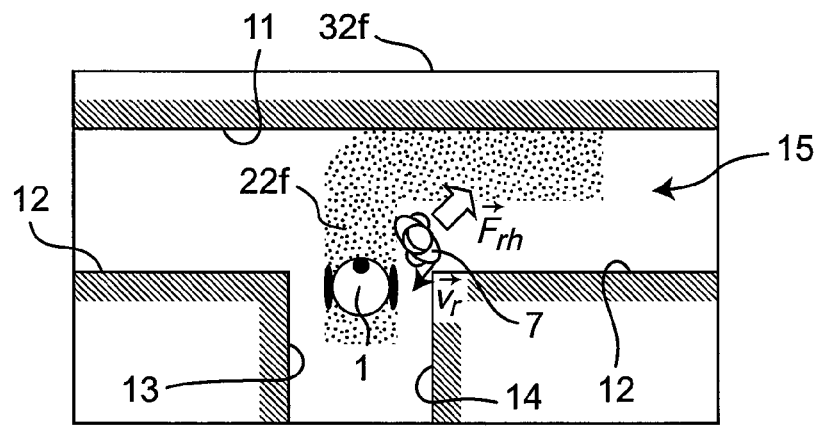
FIG. 24B is an explanatory view showing the map of the second candidate moving path of the autonomous locomotion apparatus which is drawn by the guide operation generation means of the autonomous locomotion apparatus with the intention of causing the person to predict in the fourth example.

The path selected here causes the autonomous locomotion apparatus 1 at the intersection 15a of the T-junction 15 to once move straight to approach the wall 11 of the upper side of the figure, then, turn right to move along the wall 11 of the upper side of the figure. FIG. 24A illustrates the map of the second candidate of the predicted moving path (the second candidate of the predicted moving path in <Example 4: a pattern of the person 7 with his destination still undefined>) 32f when it is assumed that the person 7 is to go straight. FIG. 24B illustrates the map 32f of the second candidate of the predicted moving path when it is assumed that the person 7 is to turn left. As illustrated in FIG. 24B, in the case where the person 7 is to turn left, the repulsive force $F_{rh}$ which is larger than the threshold for repulsive force judgment is applied to the person 7 in the direction opposite to the person 7's direction of travel. Then, the candidate of the moving path which enables the autonomous locomotion apparatus 1 to operate with the next highest operational efficiency (the third candidate of the predicted moving path in <Example 4: a pattern of the person 7 with his destination still undefined>) 22g is selected.

Figure 25A:
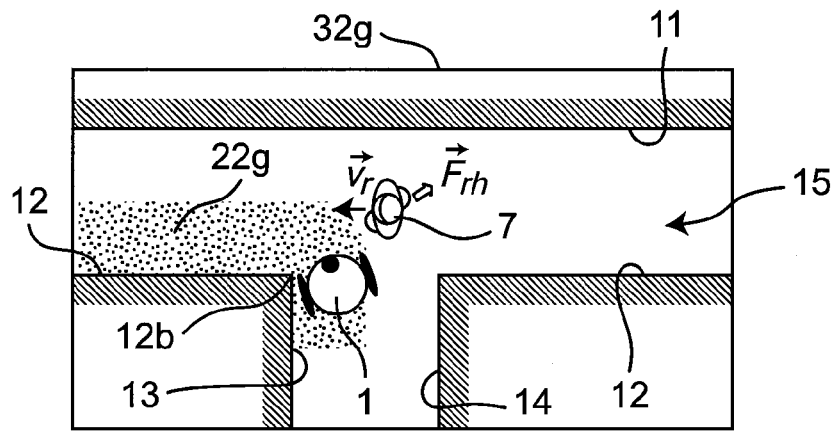
FIG. 25A is an explanatory view showing a map of a third candidate moving path of the autonomous locomotion apparatus which is drawn by the guide operation generation means of the autonomous locomotion apparatus with the intention of causing a person to predict in the fourth example.
Figure 25B:
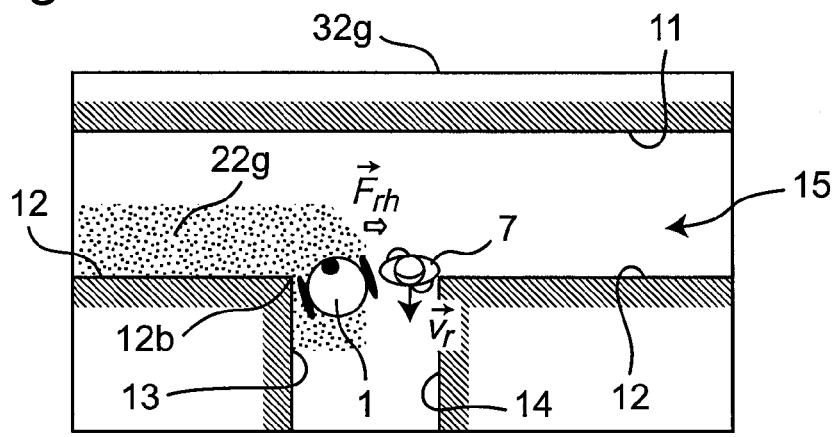
FIG. 25B is an explanatory view showing the map of the third candidate moving path of the autonomous locomotion apparatus which is drawn by the guide operation generation means of the autonomous locomotion apparatus with the intention of causing the person to predict in the fourth example.

FIGS. 25A and 25B illustrate the map of the third candidate of the predicted moving path (the third candidate of the predicted moving path in <Example 4: a pattern of the person 7 with his destination still undefined>) 32g. The candidate of the path 22g selected here causes the autonomous locomotion apparatus 1 to move along the left wall 13, then, turn left at a left corner 12b to move in the left direction (the direction opposite to the goal) along the wall 12 of the lower side of FIGS. 25A and 25B. Since the candidate of the path 22g extends in the direction opposite to the goal 10, such a path cannot be generated by the conventional method (see Patent Literature 1). The candidate of the path 22g is nothing but a temporary path to cause the person 7 to predict the predicted moving path of the autonomous locomotion apparatus 1. Both in the cases where it is assumed that the person 7 is to go straight (see FIG. 25A) and where it is assumed that the person 7 is to turn left (see FIG. 25B), since the repulsive force $F_{rh}$ received by the person 7 is smaller than the threshold for repulsive force judgment, the candidate of the moving path 22g is determined by the guide operation instruction means 105d as the predicted moving path. In order to block up the predicted moving path of the autonomous locomotion apparatus 1 which is intended to cause the person 7 to predict, the autonomous locomotion apparatus 1 generates information of the operation to cause the autonomous locomotion apparatus 1 to gradually approach the left wall 13 and turn left at the corner 12b, and based on the generated information of the guide operation, performs the motion control on the motors 2M and 3M by the traveling speed and rotational speed control means 107 (see FIG. 26A). The autonomous locomotion apparatus 1 performs the motion control on the motors 2M and 3M by the traveling speed and rotational speed control means 107 to turn the corner by stopping the left wheel 2 for a short time near the corner and causing the right wheel 3 to largely turn.

The process of determining the predicted moving path by the guide operation instruction means 105d (steps S301 to S309) may also be performed off-line. In a specific environment in which parameters are used for the movement information (the position, the speed, and the direction of travel) of the person 7, the information of a guide operation to be generated is verified with the respective parameters changed so that the information can be patterned.

As described above, the traveling speed and rotational speed control means 107 controls the traveling speed or the rotational speed of the autonomous locomotion apparatus 1 to reproduce the guide operation which presents the moving path of the autonomous locomotion apparatus 1 with the intention of causing the person 7 to predict. Specifically, the autonomous locomotion apparatus 1 has the left motor 2M and the right motor 3M respectively arranged at both sides of the lower part of the main body 1a and the encoders 2E and 3E for detecting the rotation rates of the rotational shafts of the motors 2M and 3M. The traveling speed and rotational speed control means 107 performs independent drive-control on the respective motors 2M and 3M on the basis of the information of the rotation rates of the rotational shafts of the motors 2M and 3M from the encoders 2E and 3E to enable the autonomous locomotion apparatus 1 to move forward and backward, to turn left, or to turn right.

Figure 26A:
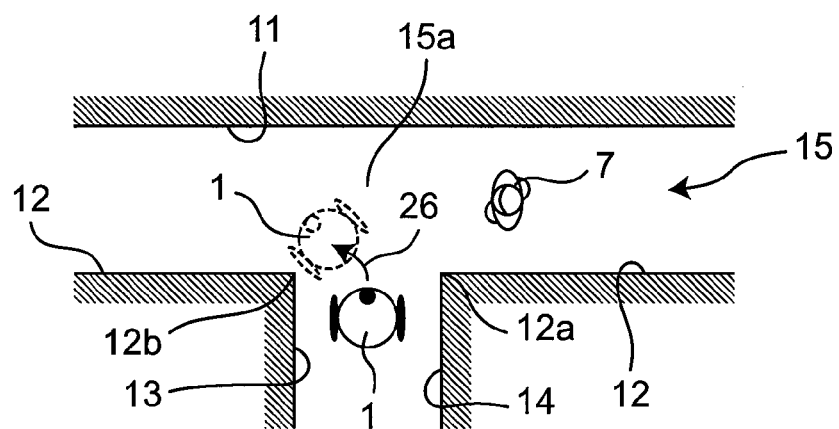
FIG. 26A is an explanatory view showing a guide operation which is generated by the guide operation generation means of the autonomous locomotion apparatus to present a moving path of the autonomous locomotion apparatus with the intention of causing the person to predict in the fourth example.

The autonomous locomotion apparatus 1 is adapted to have the traveling speed and the rotational speed in performing the guide operation slower during a predetermined period of time immediately after starting the guide operation than in the other periods so that rapid movement of the autonomous locomotion apparatus 1 does not give a sense of uneasiness to the person 7. Particularly, the path in the case of FIG. 26A is nothing but for causing the person 7 to predict, and partially extends in the direction opposite to the direction of travel. That is why the autonomous locomotive device 1 is required to slow down. When the autonomous locomotion apparatus 1 intends to cause the person 7 to predict that the autonomous locomotion apparatus 1 is to turn at the intersection of the T-junction, the autonomous locomotion apparatus 1 is required to control the traveling speed and the rotational speed by the traveling speed and rotational speed control means 107 so that the autonomous locomotion apparatus 1 stops the wheel near to one of the walls on both side of the autonomous locomotion apparatus 1 toward the wall to make the autonomous locomotion apparatus 1 turn. In the first embodiment, on the assumption that the radius 16 of the autonomous locomotion apparatus 1 is 30 cm, the autonomous locomotion apparatus 1 is required to make the traveling speed 0.1 m/s and the rotational speed 15 degrees/s at that moment, respectively, to make the movement.

Figure 27:
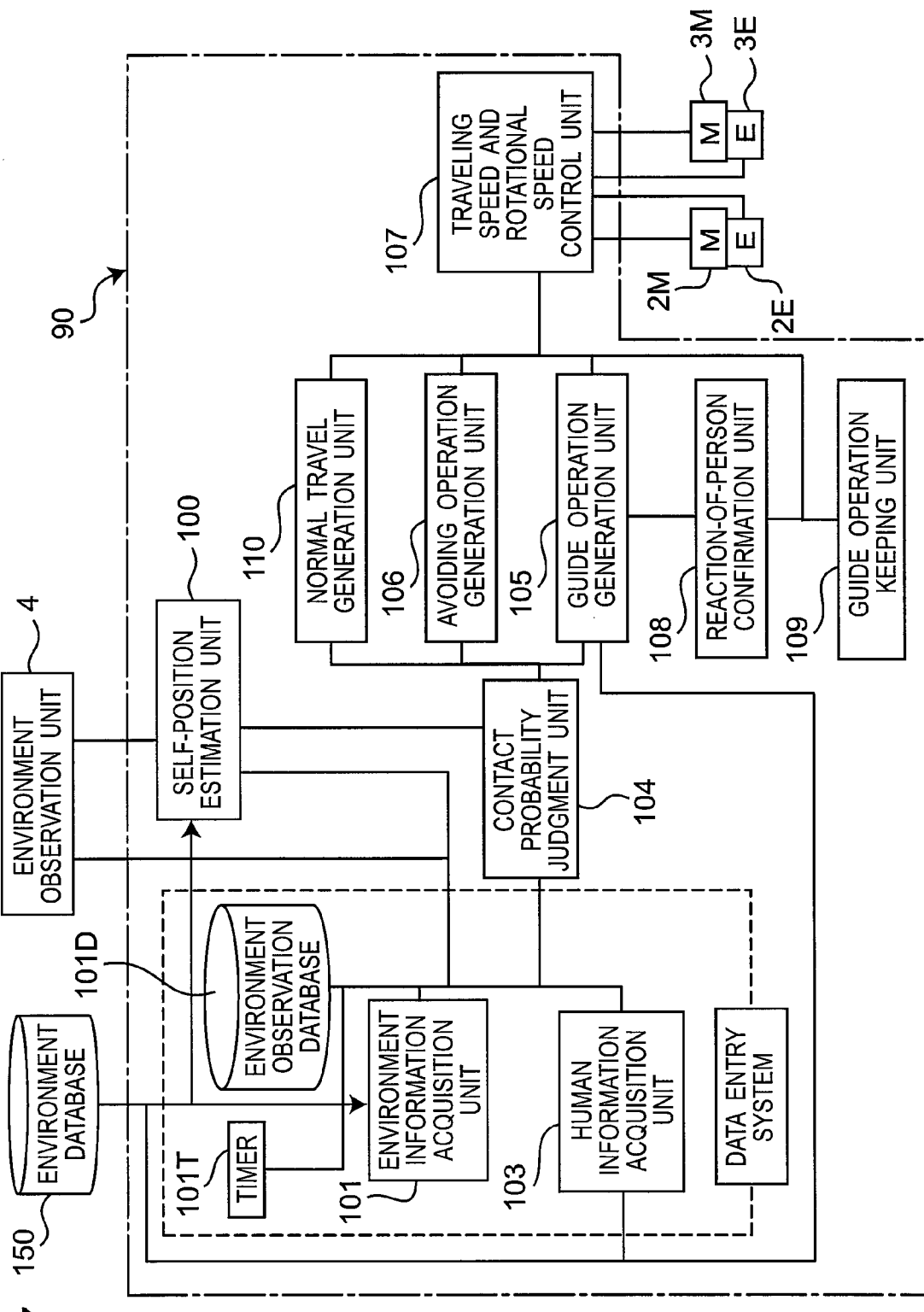
FIG. 27 is a block diagram illustrating a configuration of the autonomous locomotion apparatus in the first embodiment.

As a modification of the first embodiment, the autonomous locomotion apparatus 1 may be adapted to have the control unit 90 further include a reaction-of-person confirmation means (a reaction-of-person confirmation unit) 108 as an example of a reaction information acquisition means (a reaction information acquisition unit) and a guide operation keeping means (a guide operation keeping unit) 109 as illustrated in FIG. 27.

The reaction-of-person confirmation means 108 acquires the reaction information of the person 7 to the guide operation. Specifically, after the time when the guide operation generated by the guide operation generation means 105 is performed by the traveling speed and rotational speed control means 107, the path of the person 7 is acquired by the human information acquisition means 103 which acquires the positions of the person 7 by a predetermined period of time, and the acquired path of the person 7 is taken by the reaction-of-person confirmation means 108 as the reaction information of the person 7.

Now, expected reactions of the person 7 to the guide operation in the respective above described cases will be described.

Figure 17C:
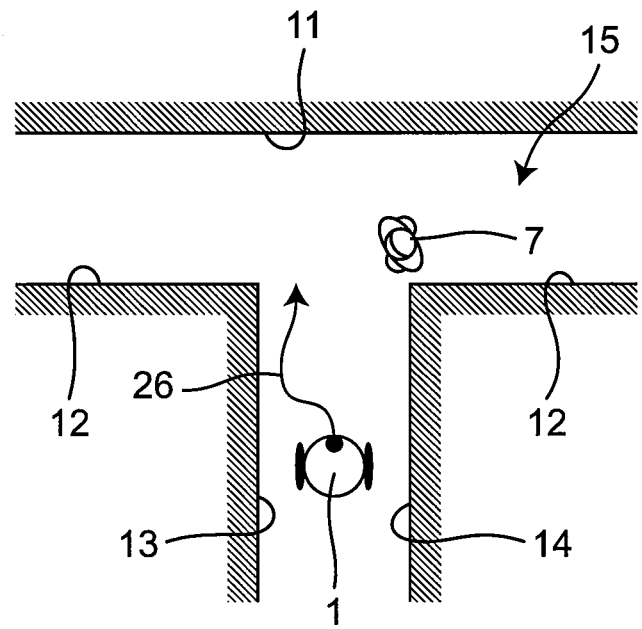
FIG. 17C is an explanatory view showing a guide operation which is generated by the guide operation generation means of the autonomous locomotion apparatus to present a moving path of the autonomous locomotion apparatus with the intention of causing the person to predict in the first example.
Figure 17D:
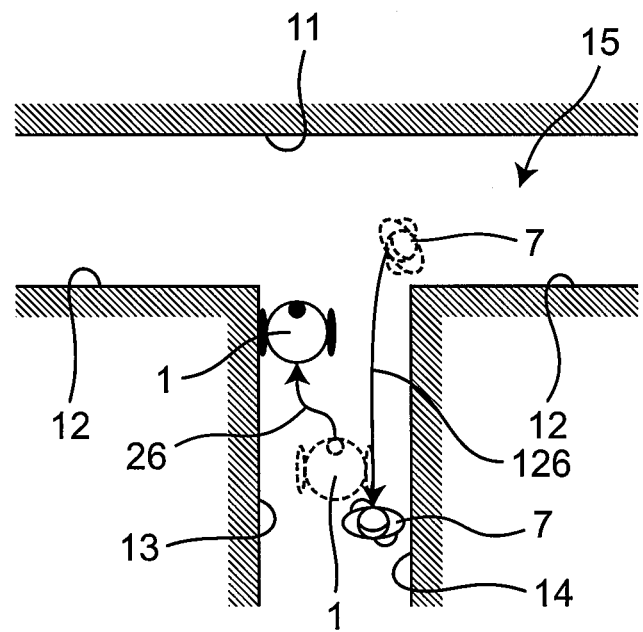
FIG. 17D is an explanatory view showing a reaction of the person which is confirmed by a reaction-of-person confirmation means of the autonomous locomotion apparatus and a continued operation which is performed by a guide operation keeping means of the autonomous locomotion apparatus according to the reaction of the person in the first example.

In the scene of the Example 1 illustrated in FIG. 15, from the guide operation to cause the autonomous locomotion apparatus 1 to approach the left wall 13, the person 7 becomes aware that there will be a space at the right wall 14 side and be able to walk along the path 126 along the right wall 14 without anxiety (see arrows 126 of FIG. 17C and FIG. 17D)

Figure 19C:
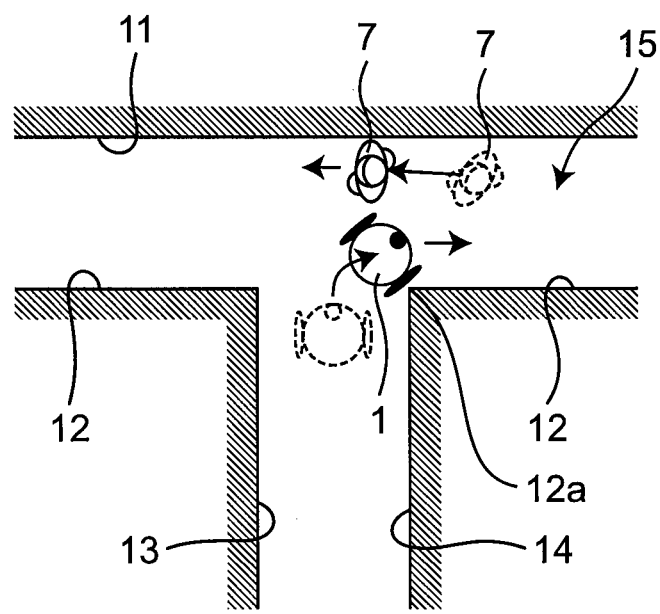
FIG. 19C is an explanatory view showing a reaction of the person which is confirmed by the reaction-of-person confirmation means of the autonomous locomotion apparatus and a continued operation which is performed by the guide operation keeping means of the autonomous locomotion apparatus according to the reaction of the person in the second example.

In the scene of the Example 2 illustrated in FIG. 18, the person 7 at the wall 11 side of the upper side of FIG. 18 becomes aware that the autonomous locomotion apparatus 1 intends to turn right along the wall 12 of the lower side of FIG. 18, and can keep walking along the wall 11 of the upper side of the figure without anxiety (see FIG. 19C).

Figure 21C:
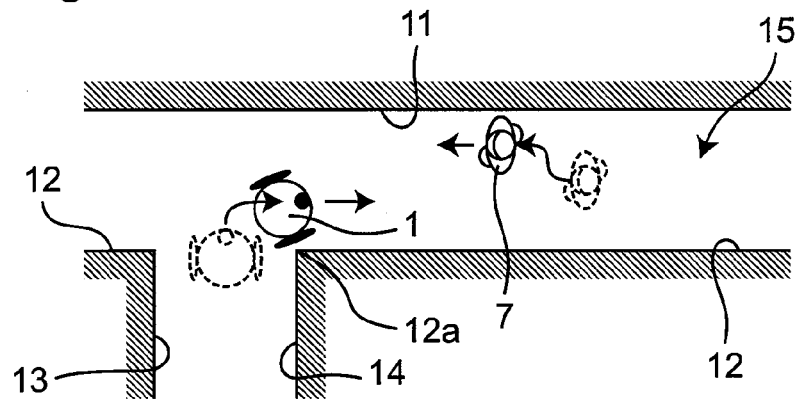
FIG. 21C is an explanatory view showing a reaction of the person which is confirmed by the reaction-of-person confirmation means of the autonomous locomotion apparatus and a continued operation which is performed by the guide operation keeping means of the autonomous locomotion apparatus according to the reaction of the person in the third example.

In the scene of the Example 3 illustrated in FIG. 20, the person 7 who is at some distance from the autonomous locomotion apparatus 1 becomes aware that the autonomous locomotion apparatus 1 intends to turn right along the wall 12 of the lower side of the figure. Since the person 7 is not only at some distance from the autonomous locomotion apparatus 1 but also being aware that the autonomous locomotion apparatus 1 is turning the corner 12a slowly, the person 7 reacts to the encounter by moving near to the wall 11 of the upper side of FIG. 20 to avoid the autonomous locomotion apparatus 1 without anxiety (see FIG. 21C). Then, the person 7 starts walking along the wall 11 of the upper side of the figure.

Figure 26B:
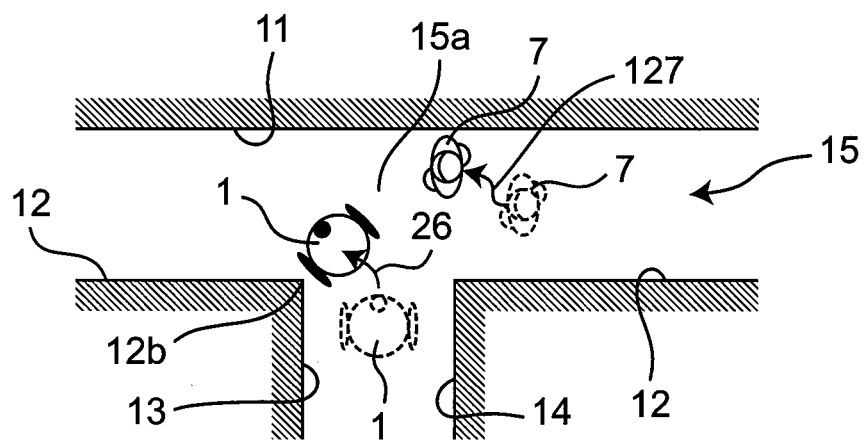
FIG. 26B is an explanatory view showing a reaction of the person which is confirmed by the reaction-of-person confirmation means of the autonomous locomotion apparatus in the fourth example.
Figure 26C:
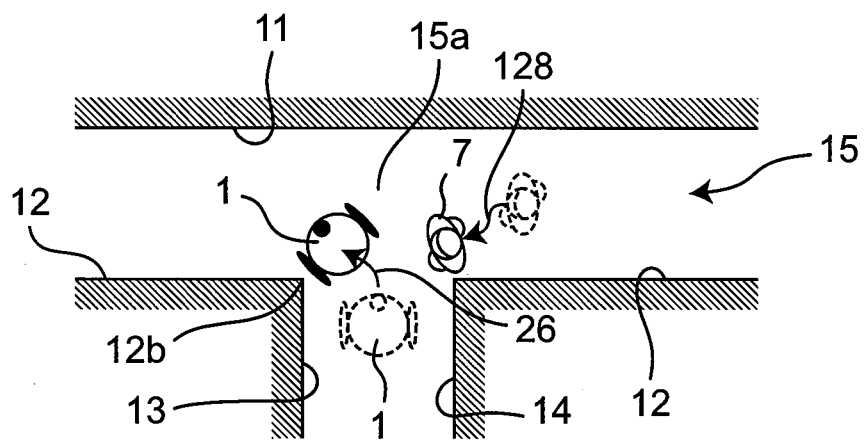
FIG. 26C is an explanatory view showing the reaction of the person which is confirmed by the reaction-of-person confirmation means of the autonomous locomotion apparatus in the fourth example.

In the scene of the Example 4 illustrated in FIG. 22, the person 7 who is still in the middle of the passage 15 becomes aware that the autonomous locomotion apparatus 1 is turning left along the wall 12 of the lower side of the figure. The autonomous locomotion apparatus 1 is moving slowly at that moment, so that the person 7 recognizes that the autonomous locomotion apparatus 1 is moving more slowly than himself or herself. The autonomous locomotion apparatus 1 occupies a space at the wall 12 side of the lower side of FIG. 22, and the person 7 who is walking straight ahead reacts to the autonomous locomotion apparatus 1 by moving near to the wall 11 of the upper side of the figure to avoid the autonomous locomotion apparatus 1 (see an arrow 127 of FIG. 26B). Since the autonomous locomotion apparatus 1 is moving slowly, the person 7 can avoid the autonomous locomotion apparatus 1 without anxiety. The person 7 who is turning left reacts to the movement of the autonomous locomotion apparatus 1 by moving near to the wall 12 of the lower side of the figure to avoid the autonomous locomotion apparatus 1 (see an arrow 128 of FIG. 26C)

Even though the destination of the person 7 is undefined at first, the person 7 begins to show the person's destination by his movement according to the guide operation performed by the autonomous locomotion apparatus 1. Once the person 7 makes a reaction expected by the autonomous locomotion apparatus 1, the autonomous locomotion apparatus 1 performs the guide operation keeping operation by the guide operation keeping means 109 as below. When the person 7 makes a reaction, which raises the probability of collision between the person 7 and the autonomous locomotion apparatus 1, the autonomous locomotion apparatus 1 generates an avoiding operation by the avoiding operation generation means 106 (to be described later)

The guide operation keeping means 109 keeps the guide operation by determining to continue the operation of the autonomous locomotion apparatus 1 performed at that moment, i.e., by determining the continuing operation according to the reaction of the person 7 confirmed by the reaction-of-person confirmation means 108.

Figure 28A:
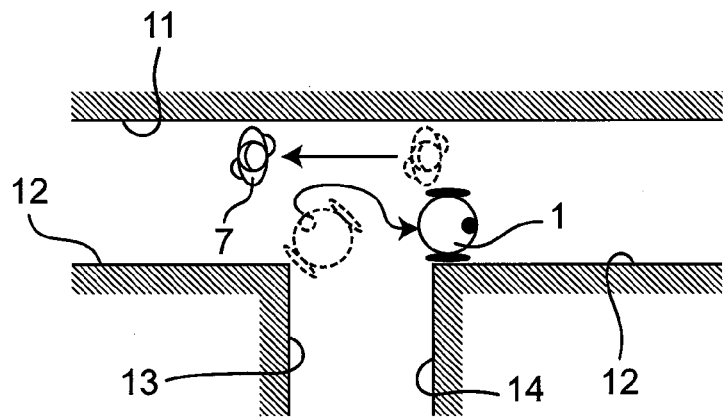
FIG. 28A is an explanatory view showing a continued operation which is performed by the guide operation keeping means of the autonomous locomotion apparatus according to a reaction of the person in a modification of the first embodiment.
Figure 28B:
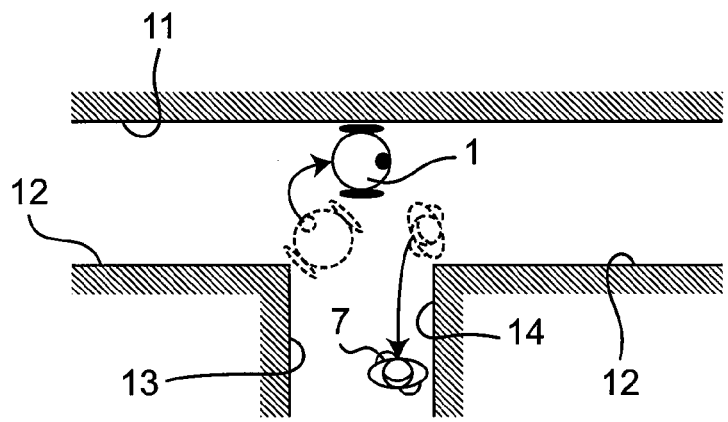
FIG. 28B is an explanatory view showing the continued operation which is performed by the guide operation keeping means of the autonomous locomotion apparatus according to the reaction of the person in a modification of the first embodiment.

Even though the destination of the person 7 is undefined at first, the person 7 begins to show the person's destination by his movement according to the guide operation performed by the autonomous locomotion apparatus 1, and then, the autonomous locomotion apparatus 1 performs the continuing operation in a space other than the destination. In the scene of the Example 1 illustrated in FIG. 15, in the case where the person 7 moves near to the wall 11 of the upper side of FIG. 15 or FIG. 28A, the autonomous locomotion apparatus 1 makes a small turn and moves ahead to the right along the wall 12 of the lower side of FIG. 28A (see FIG. 28A). On the other hand, in the case where the person 7 moves near to the wall 12 of the lower side of FIG. 15 or FIG. 28B, the autonomous locomotion apparatus 1 makes a large turn and moves ahead to the right along the wall 11 of the upper side of FIG. 28B (see FIG. 28B).

Figure 29:
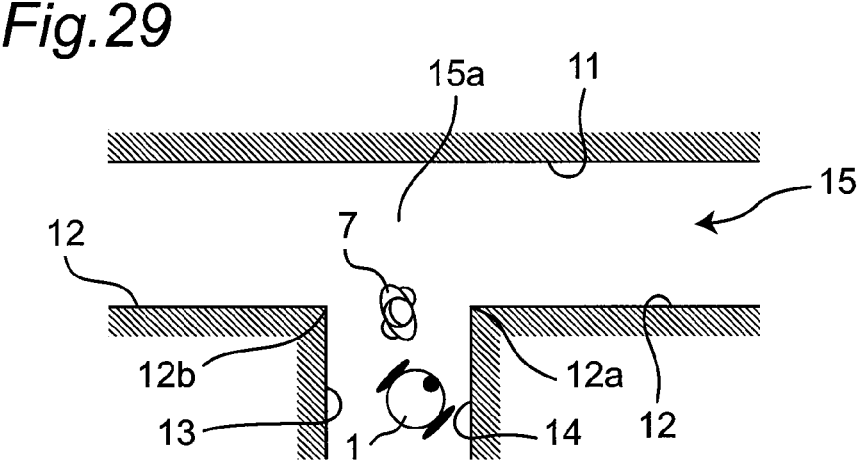
FIG. 29 is an explanatory view showing an example of avoiding operation performed by the autonomous locomotion apparatus in a modification of the first embodiment.

In the case where the obstacle is not the person 7, the case where it is impossible to induce the person 7 to make a movement of avoiding the moving path of the autonomous locomotion apparatus 1, or the case where the reaction of the person 7 may cause a collision between the person 7 and the autonomous locomotion apparatus 1 even though the guide operation is performed, the avoiding operation generation means 106 generates information of the avoiding operation. FIG. 29 illustrates an example of an avoiding operation performed by the autonomous locomotion apparatus 1. The autonomous locomotion apparatus 1 may use the conventional method (Patent Literature 1) in performing the avoiding operation. Stopping or moving back of the autonomous locomotion apparatus 1 may be considered to be the avoiding operation. In the avoiding operation, the autonomous locomotion apparatus 1 is allowed to closely approach a wall or the static obstacle 8 included in the environment map 6, but does not approach the static obstacle 9 which is not included in the environment map 6. The autonomous locomotion apparatus 1 does not approach the static obstacle 9 which is not included in the environment map 6 because that may be the only moment the static obstacle 9 stops moving and the whole or part of the static obstacle 9 may suddenly move to hit the autonomous locomotion apparatus 1.

The normal travel generation means 110 performs the process of normal travel generation for keeping the autonomous locomotion apparatus 1 traveling as it is. Based on information of a normal travel operation generated by the normal travel generation means 110 in the process of normal travel generation, the motion control is performed on the motors 2M and 3M by the traveling speed and rotational speed control means 107 so that traveling of the autonomous locomotion apparatus 1 is kept as it is. The normal travel generation means 110 performs processing on traveling with no unknown obstacle around.

Figure 30:
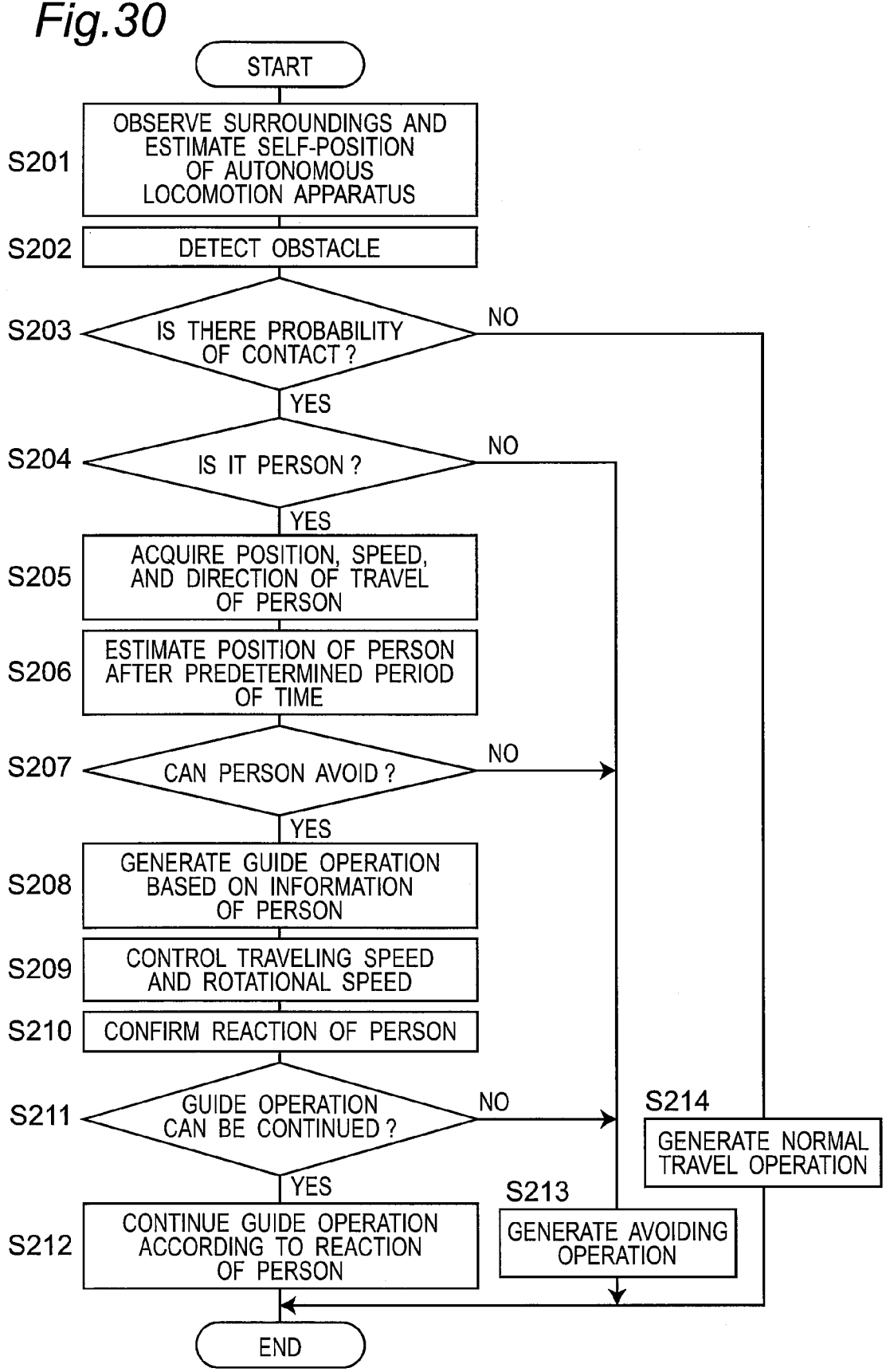
FIG. 30 is a flowchart describing an operational procedure of the autonomous locomotion apparatus in a modification of the first embodiment.

FIG. 30 shows an autonomous locomotive process flow according to the first embodiment.

First, in step S201, the autonomous locomotion apparatus 1 travels while observing environment information of the surroundings of itself by using the LRF sensor 4, acquires the environment information by the environment information acquisition means 101, and records the environment information in the environment information database 101D. The autonomous locomotion apparatus 1 performs the self-position estimation of itself in the self-position estimation unit 100 by comparing the data of the environment information observed by the LRF sensor 4 and acquired by the environment information acquisition means 101 with the environment map 6 by the self-position estimation unit 100.

Next, in step S202, an obstacle(s) 9 which is not included in the environment map 6 in the environment database 150 is detected by the human information acquisition means 103 from the environment information. When an obstacle 9 which is not included in the environment map 6 is not detected, the series of processes is finished.

Next, in step S203, whether there is probability of contact between the autonomous locomotion apparatus 1 and the obstacle detected by the human information acquisition means 103 is judged by the contact probability judgment means 104. When it is judged by the contact probability judgment means 104 that there is no probability of contact between the autonomous locomotion apparatus 1 and the detected obstacle, the process proceeds to step S214. In step S214, the process of normal travel generation is performed by the normal travel generation means 110 which is for keeping the autonomous locomotion apparatus 1 traveling as it is, and based on the generated information of a normal travel operation, the motion control is performed on the motors 2M and 3M by the traveling speed and rotational speed control means 107 so that the traveling of the autonomous locomotion apparatus 1 is kept as it is, and the series of processes is finished. On the other hand, when it is judged by the contact probability judgment means 104 that there is probability of contact between the autonomous locomotion apparatus 1 and the detected obstacle, the process proceeds to step S204.

In step S204, whether the detected obstacle is the person 7 is judged by the human information acquisition means 103. When it is judged by the human information acquisition means 103 that the detected obstacle is not the person 7, the process proceeds to step S213. In step S213, information of the avoiding operation is generated by the avoiding operation generation means 106 with respect to the obstacle, and based on the generated information of the avoiding operation, the motion control is performed on the motors 2M and 3M by the traveling speed and rotational speed control means 107 so that the autonomous locomotion apparatus 1 is caused to perform the avoiding operation, and the series of processes is finished.

On the other hand, when it is judged by the human information acquisition means 103 that the detected obstacle is the person 7, the process proceeds to step S205.

In step S205, information (the position, the speed, and the direction of travel) of the person 7 is acquired by the human information acquisition means 103.

Next, in step S206, based on the movement information of the person 7 from the human information acquisition means 103, the position of the person 7 after a predetermined period of time is estimated by the future position prediction means 104b-1.

Next, in step S207, probability of inducing the person 7 to make a movement of avoiding the moving path of the autonomous locomotion apparatus 1 is judged by the imminent contact risk judgment means 104b-2 of the contact probability judgment means 104. When it is judged by the imminent contact risk judgment means 104b-2 that there is no probability of inducing the person 7 to make a movement of avoiding the autonomous locomotion apparatus 1, the process proceeds to step S213. In step S213, information of the avoiding operation is generated by the avoiding operation generation means 106, and based on the generated information of the avoiding operation, the motion control is performed on the motors 2M and 3M by the traveling speed and rotational speed control means 107 so that the autonomous locomotion apparatus 1 is caused to perform the avoiding operation, and the series of processes is finished.

When it is judged by the imminent contact risk judgment means 104b-2 that there is probability of inducing the person 7 to make a movement of avoiding the autonomous locomotion apparatus 1 in step S207, the process proceeds to step S208.

In step S208, information of the guide operation 26 which indicates the moving path of the autonomous locomotion apparatus 1 which is intended to cause the person 7 to predict is generated by the guide operation generation means 105 based on the movement information of the person 7.

Next, in step S209, the traveling speed and rotational speed control means 107 controls the traveling speed and/or the rotational speed of the autonomous locomotion apparatus 1 to reproduce the guide operation 26 which presents the moving path of the autonomous locomotion apparatus 1 which is intended to cause the person 7 to predict. That is, the motion control is performed on the motors 2M and 3M by the traveling speed and rotational speed control means 107 based on the generated information of the guide operation 26.

Next, in step S210, the reaction information of the person 7 to the guide operation 26 is acquired by the reaction-of-person confirmation means 108.

Next, in step S211, whether the guide operation 26 can be continued is judged by the guide operation keeping means 109 from the reaction of the person 7 acquired by the reaction-of-person confirmation means 108. When it is judged by the guide operation keeping means 109 that the guide operation 26 cannot be continued, the process proceeds to step S213. In step S213, information of the avoiding operation is generated by the avoiding operation generation means 106, and based on the generated information of the avoiding operation, the motion control is performed on the motors 2M and 3M by the traveling speed and rotational speed control means 107 so that the autonomous locomotion apparatus 1 is caused to perform the avoiding operation, and the series of processes is finished.

When it is judged by the guide operation keeping means 109 that the guide operation 26 can be continued, the continuing operation is determined by the guide operation keeping means 109 according to the reaction of the person 7, and the process proceeds to step S212.

In step S212, the guide operation 26 is kept by the guide operation keeping means 109. Based on the determination to keep the operation by the guide operation keeping means 109, the motion control is performed on the motors 2M and 3M by the traveling speed and rotational speed control means 107 so that the operation of the autonomous locomotion apparatus 1 is kept as it is and the autonomous locomotion apparatus 1 is caused to perform the avoiding operation, and the series of processes is finished.

According to the autonomous locomotion apparatus, the autonomous locomotion method, and the program for the autonomous locomotion apparatus of the first embodiment of the present invention, when the autonomous locomotion apparatus 1 and a person 7 are passing each other, the autonomous locomotion apparatus 1 can pass by the person 7 without decreasing the operational efficiency and also without making the person feel uneasy.

According to the environment information acquisition means 101 and the self-position estimation unit 100, the position of such an obstacle as the person 7 and the self-position of the autonomous locomotion apparatus 1 during the traveling can be estimated; and according to the human information acquisition means 103, the person 7 can be detected in the observed environment or obstacles, and the position, the speed, and the direction of travel about the detected person 7 can also be acquired.

According to the contact probability judgment means 104, based on the physical relationship between the person 7 and the autonomous locomotion apparatus 1, the operation mode (for example, the normal travel operation, the avoiding operation, the guide operation) can be selected to show what kind of operation mode is to be executed. When the contact probability judgment means 104 judges that there is no probability of contact between the person 7 and the autonomous locomotion apparatus 1, the travel operation of the autonomous locomotion apparatus 1 can be kept as it is by the normal travel generation means 110. When the contact probability judgment means 104 judges that there is probability of contact between the person 7 and the autonomous locomotion apparatus 1, it is judged whether the autonomous locomotion apparatus 1 can guide the person 7. When the contact probability judgment means 104 judges that the autonomous locomotion apparatus 1 can guide the person 7, information of the guide operation is generated by the guide operation generation means 105 to cause the person 7 to avoid the path of the autonomous locomotion apparatus 1. When the contact probability judgment means 104 judges that the autonomous locomotion apparatus 1 cannot guide the person 7, information of the avoiding operation is generated by the avoiding operation generation means 106.

According to the guide operation generation means 105, the operation for the person 7 and the autonomous locomotion apparatus 1 to pass each other can be made more smoothly. Since the autonomous locomotion apparatus 1 performs the guide operation while traveling, the operational efficiency of the autonomous locomotion apparatus 1 is not decreased. Moreover, since the information of the guide operation is generated to enable the autonomous locomotion apparatus 1 to operate with the highest efficiency but not to make the person 7 feel uneasy, the person 7 is free from a sense of uneasiness when the person 7 and the autonomous locomotion apparatus 1 pass each other.

According to the traveling speed and rotational speed control means 107, the traveling speed and the rotational speed can be controlled so that the autonomous locomotion apparatus 1 reproduces the operation (the normal travel, the guide operation, the avoiding operation) to be generated.

According to the reaction-of-person confirmation means 108, how the person 7 reacts to the guide operation can be confirmed. According to the guide operation generation means 109, the guide operation can be kept based on the reaction of the person 7.

Figure 10B:
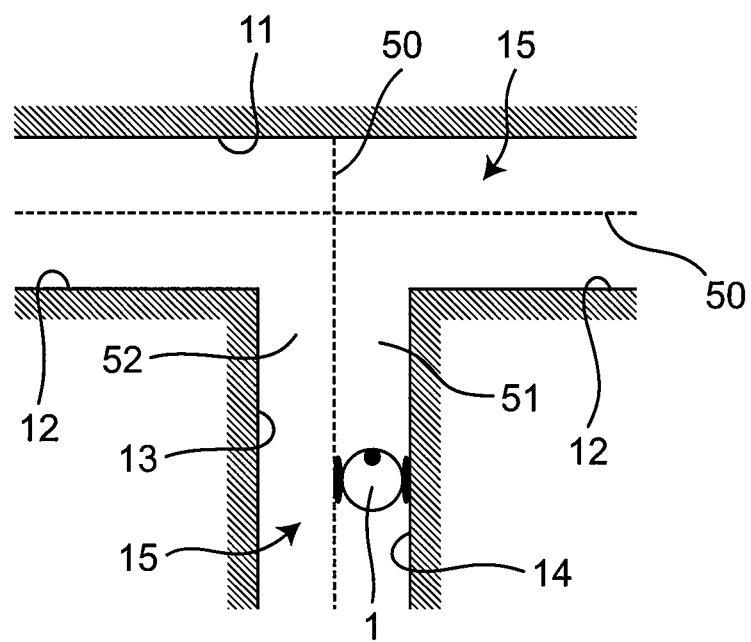
FIG. 10B is a view illustrating the region division of the passage in generating the plurality of moving paths in the first embodiment.
Figure 10C:
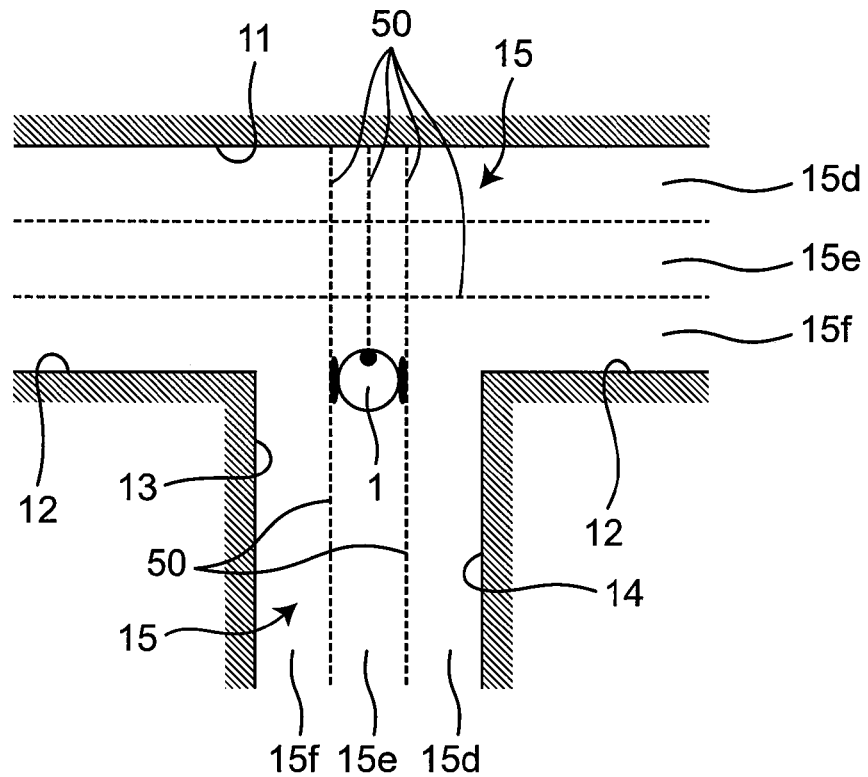
FIG. 10C is a view illustrating the region division of the passage in generating the plurality of moving paths in the first embodiment.

The first embodiment is described in the case where the passage 15 for the autonomous locomotion apparatus 1 to travel is divided into two regions as illustrated in FIG. 10A and the autonomous locomotion apparatus 1 travels in each of the regions as illustrated in FIG. 10B, for example. The present invention is not limited to that case and the passage may be divided into any number of regions. For example, the passage 15 may be divided into three regions by boundaries 50 as illustrated in FIG. 10C so that the autonomous locomotion apparatus 1 travels in any one of the right side passage 15d, the center passage 15e, and the left side passage 15f. In other words, it is preferable that the passage for the person 7 to walk in can be surely reserved by appropriately dividing the passage into regions according to the width of the autonomous locomotion apparatus 1 and the width of the passage so that the autonomous locomotion apparatus 1 travels in any of the resultant regions and the person 7 walks in any of the other regions.

By properly combining the arbitrary embodiment (s) or modification(s) of the aforementioned various embodiments and modifications, the effects possessed by the embodiment (s) or modification(s) can be produced.

Though the present disclosure has been described above based on the above first embodiment and the modifications, the present disclosure should not be limited to the above-described first embodiment and the modifications. For example, the present disclosure also includes the following cases.

Part or entirety of each of the above-described autonomous locomotion apparatuses is actually a computer system that includes, for example, a microprocessor, ROM, RAM, hard disk unit, display unit, keyboard, mouse, and the like. A computer program is stored on the RAM or the hard disk unit. Functions of each of the apparatuses can be achieved by the microprocessor operating according to the computer program. The computer program mentioned here is a combination of a plurality of instruction codes that indicate commands to a computer for achieving predetermined functions.

For example, each component can be implemented as a result that a program executing section (part/unit) such as a CPU reads and executes software programs recorded in a recording medium such as a hard disk or semiconductor memory. Here, software that implements a part or entirety of the apparatus according to each of the above-mentioned embodiment and modifications is a following program. That is to say, this program is a program for an autonomous locomotion apparatus which autonomously moves based on a moving path, wherein the program causes a computer to function as:

an environment information acquisition unit that acquires environment information including information about a person or an object in surroundings of the autonomous locomotion apparatus;

a human information acquisition unit that detects the person based on the environment information acquired by the environment information acquisition unit;

a contact probability judgment unit that judges presence or absence of probability of guiding an avoiding operation of the person on condition that there is probability of contact between the person and the autonomous locomotion apparatus based on the environment information at a moment when the person is detected by the human information acquisition unit;
a guide operation generation unit that generates guide operation information which presents a predicted moving path of the autonomous locomotion apparatus to the person on the condition that there is probability of guiding an avoiding operation of the person;
a traveling speed and rotational speed control unit that controls movement of the autonomous locomotion apparatus based on the guide operation information from the guide operation generation unit;
a reaction information acquisition unit that acquires reaction information of the person with respect to a guide operation performed by the traveling speed and rotational speed control unit controlling the movement of the autonomous locomotion apparatus based on the guide operation information; and
a guide operation keeping unit that keeps the guide operation according to the reaction information acquired by the reaction information acquisition unit.

In addition, it may be possible to execute the program by downloading it from a server or reading it from a predetermined storage medium (an optical disc such as a CD-ROM, a magnetic disc, a semiconductor memory, or the like)

Further, one or more computers can be used to execute the program. That is, centralized processing or distributed processing can be performed.

By properly combining the arbitrary embodiment (s) or modification(s) of the aforementioned various embodiments and modifications, the effects possessed by the embodiment (s) or modification(s) can be produced.

The autonomous locomotion apparatus, the autonomous locomotion method, and the program for the autonomous locomotion apparatus according to the present invention have a function of guide operation and are usefully applied to a load-carrying robot and a cleaning robot in a hospital. They can also be applied to a use of an automatic wheelchair or the like.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

What is claimed is:

1. An autonomous locomotion apparatus which autonomously moves based on a moving path, comprising a control unit,
the control unit comprising:
an environment information acquisition unit that acquires environment information including information about a person or an object in surroundings of the autonomous locomotion apparatus;
a human information acquisition unit that detects the person based on the environment information acquired by the environment information acquisition unit;
a contact probability judgment unit that judges presence or absence of probability of guiding an avoiding operation of the person on condition that there is probability of contact between the person and the autonomous locomotion apparatus based on the environment information at a moment when the person is detected by the human information acquisition unit;
a guide operation generation unit that generates guide operation information which presents a predicted moving path of the autonomous locomotion apparatus to the person on the condition that there is probability of guiding an avoiding operation of the person;
a traveling speed and rotational speed control unit that controls movement of the autonomous locomotion apparatus based on the guide operation information from the guide operation generation unit;
a reaction information acquisition unit that acquires reaction information of the person with respect to a guide operation performed by the traveling speed and rotational speed control unit controlling the movement of the autonomous locomotion apparatus based on the guide operation information; and
a guide operation keeping unit that keeps the guide operation according to the reaction information acquired by the reaction information acquisition unit.

2. The autonomous locomotion apparatus according to claim 1, further comprising: an avoiding operation generation unit that generates an avoiding operation to be performed by the autonomous locomotion apparatus on condition that an obstacle other than the person is included in the environment information acquired by the environment information acquisition unit, or on condition that it is impossible to induce the person to make a movement of avoiding the moving path of the autonomous locomotion apparatus.

3. The autonomous locomotion apparatus according to claim 1, wherein the environment information acquisition unit acquires the environment information observed by an environment observation unit which includes at least one of an LRF sensor, a millimeter-wave sensor, an ultrasonic sensor, and a stereo-camera.

4. The autonomous locomotion apparatus according to claim 1, wherein the human information acquisition unit acquires a position, a speed, and a direction of travel of the person as movement information.

5. The autonomous locomotion apparatus according to claim 1, wherein the guide operation generation unit generates the predicted moving path of the autonomous locomotion apparatus with respect to the person by selecting a candidate from guide path candidates of high priorities based on a magnitude and a direction of a repulsive force applied to the person due to potential of the autonomous locomotion apparatus.

6. The autonomous locomotion apparatus according to claim 4, wherein the guide operation generation unit generates the guide operation according to the movement information of the person, and the guide operation indicates that the moving path of the autonomous locomotion apparatus which is intended to cause the person to predict, is a path for the autonomous locomotion apparatus to temporarily travel in a direction opposite to that of a goal of the autonomous locomotion apparatus.

7. The autonomous locomotion apparatus according to claim 4, wherein the guide operation generation unit generates the guide operation which is intended to cause the person to indicate a destination by the movement when the destination of the person is unknown even with the movement information of the person acquired by the human information acquisition unit.

8. The autonomous locomotion apparatus according to claim 1, wherein the guide operation generation unit generates, as the guide operation, an operation of the autonomous locomotion apparatus to block the moving path of the autonomous locomotion apparatus which is intended to cause the person to predict.

9. The autonomous locomotion apparatus according to claim 1, wherein the guide operation generation unit generates, as the guide operation, an operation for the autonomous locomotion apparatus to approach one of walls of both sides of the moving path while the autonomous locomotion apparatus is traveling to present the moving path of the autonomous locomotion apparatus which is intended to cause the person to predict.

10. The autonomous locomotion apparatus according to claim 1, wherein the traveling speed and rotational speed control unit makes a traveling speed or a rotational speed of the autonomous locomotion apparatus slower during a predetermined period of time immediately after starting of the guide operation than in other periods, and the traveling speed and rotational speed control unit acquires the reaction information of the person by the reaction information acquisition unit in the predetermined period of time immediately after starting of the guide operation.

11. The autonomous locomotion apparatus according to claim 1, wherein the traveling speed and rotational speed control unit controls the traveling speed and the rotational speed to cause the autonomous locomotion apparatus to approach one of the walls of both sides of the path, when it is intended to cause the person to predict that the autonomous locomotion apparatus is to turn at a T-shaped passage or intersection.

12. The autonomous locomotion apparatus according to claim 7, wherein, after it is judged that the destination of the person is indicated by the movement based on the movement information of the person acquired by the human information acquisition unit, the guide operation keeping unit keeps performing the operation of the autonomous locomotion apparatus in a space in a passage other than that toward the indicated destination.

13. The autonomous locomotion apparatus according to claim 2, wherein the avoiding operation generation unit generates the avoiding operation on condition that the reaction of the person may cause a collision between the person and the autonomous locomotion apparatus even though the guide operation is performed.

14. An autonomous locomotion method for an autonomous locomotion apparatus to autonomously move based on a moving path, comprising:

acquiring environment information including information about a person or an object in surroundings of the autonomous locomotion apparatus by an environment information acquisition unit;

detecting the person by a human information acquisition unit based on the environment information acquired by the environment information acquisition unit;

judging presence or absence of probability of guiding an avoiding operation of the person by a contact probability judgment unit on condition that there is probability of contact between the person and the autonomous locomotion apparatus based on the environment information at a moment when the person is detected by the human information acquisition unit;

generating guide operation information which presents a predicted moving path of the autonomous locomotion apparatus to the person by a guide operation generation unit on condition that there is probability of guiding an avoiding operation of the person;

controlling movement of the autonomous locomotion apparatus by a traveling speed and rotational speed control unit based on the guide operation information from the guide operation generation unit;

acquiring, by a reaction information acquisition unit, reaction information of the person with respect to a guide operation performed by the traveling speed and rotational speed control unit controlling the movement of the autonomous locomotion apparatus based on the guide operation information; and keeping, by a guide operation keeping unit, the guide operation according to the reaction information acquired by the reaction information acquisition unit.

15. A computer-readable recording medium including a program for an autonomous locomotion apparatus which autonomously moves based on a moving path, wherein the program causes a computer to function as:

an environment information acquisition unit that acquires environment information including information about a person or an object in surroundings of the autonomous locomotion apparatus;

a human information acquisition unit that detects the person based on the environment information acquired by the environment information acquisition unit;

a contact probability judgment unit that judges presence or absence of probability of guiding an avoiding operation of the person on condition that there is probability of contact between the person and the autonomous locomotion apparatus based on the environment information at a moment when the person is detected by the human information acquisition unit;

a guide operation generation unit that generates guide operation information which presents a predicted moving path of the autonomous locomotion apparatus to the person on the condition that there is probability of guiding an avoiding operation of the person;

a traveling speed and rotational speed control unit that controls movement of the autonomous locomotion apparatus based on the guide operation information from the guide operation generation unit;

a reaction information acquisition unit that acquires reaction information of the person with respect to a guide operation performed by the traveling speed and rotational speed control unit controlling the movement of the autonomous locomotion apparatus based on the guide operation information; and a guide operation keeping unit that keeps the guide operation according to the reaction information acquired by the reaction information acquisition unit.

\* \* \* \* \*